May 22, 1956 C. FIELD 2,746,263
CONGEALED PRODUCT AND APPARATUS AND MEANS FOR MAKING SAME
Filed Dec. 13, 1951 18 Sheets-Sheet 1

INVENTOR.
Crosby Field
BY
Curtis, Morris + Safford
ATTORNEYS

May 22, 1956 C. FIELD 2,746,263
CONGEALED PRODUCT AND APPARATUS AND MEANS FOR MAKING SAME
Filed Dec. 13, 1951 18 Sheets-Sheet 2

INVENTOR.
Crosby Field
BY
Curtis, Morris & Safford
ATTORNEYS

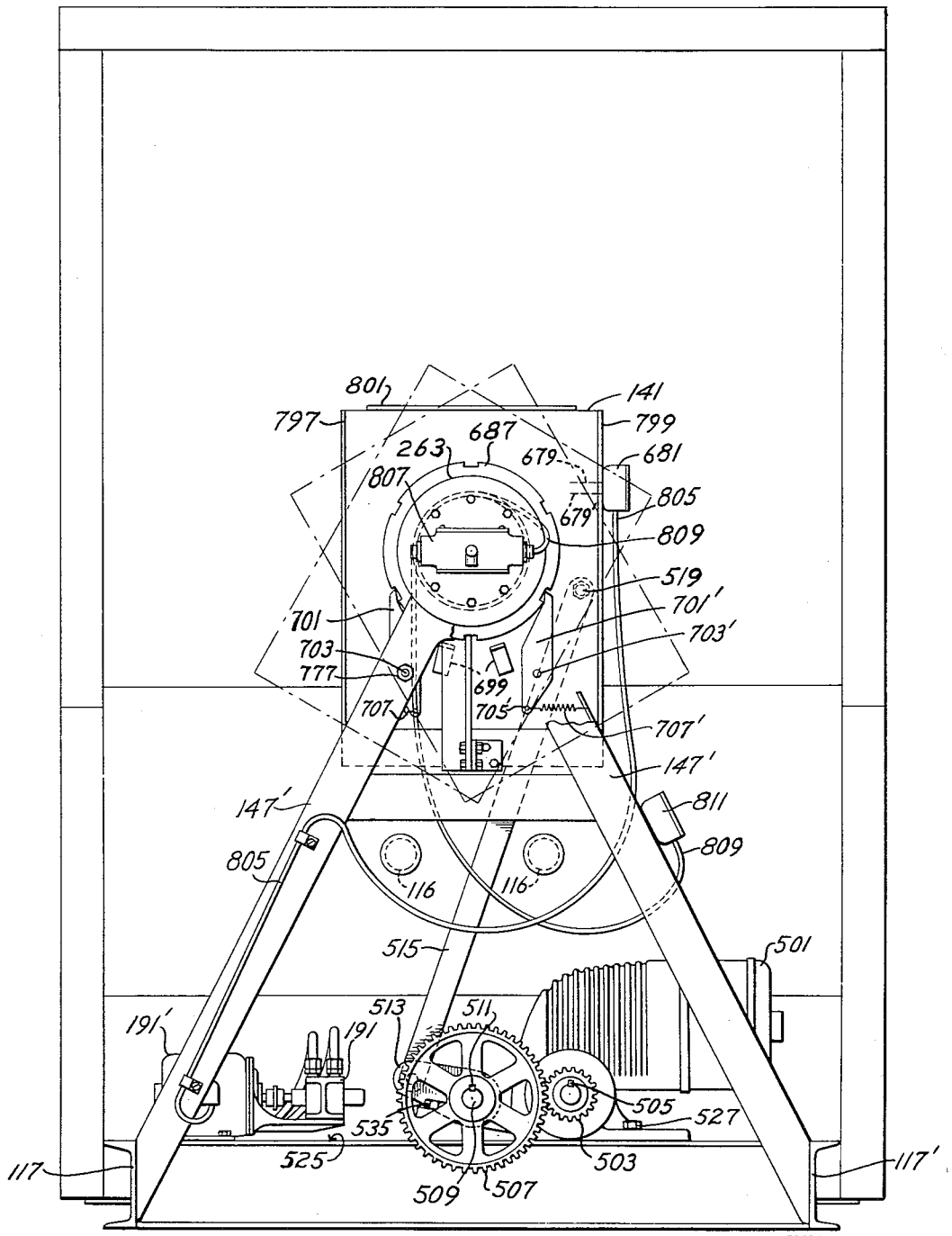

May 22, 1956 C. FIELD 2,746,263
CONGEALED PRODUCT AND APPARATUS AND MEANS FOR MAKING SAME
Filed Dec. 13, 1951 18 Sheets-Sheet 4
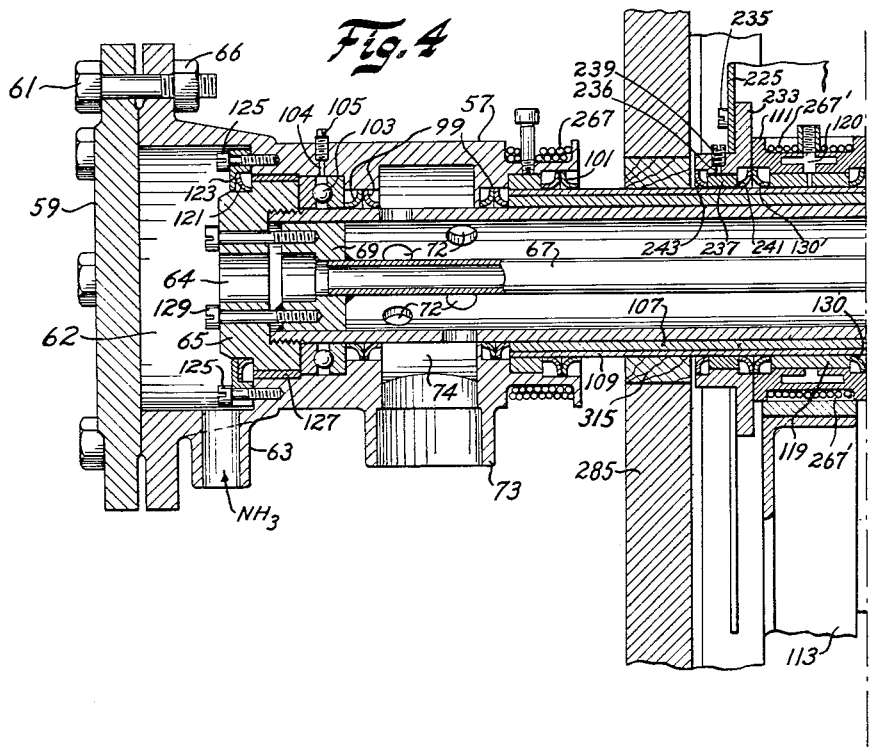
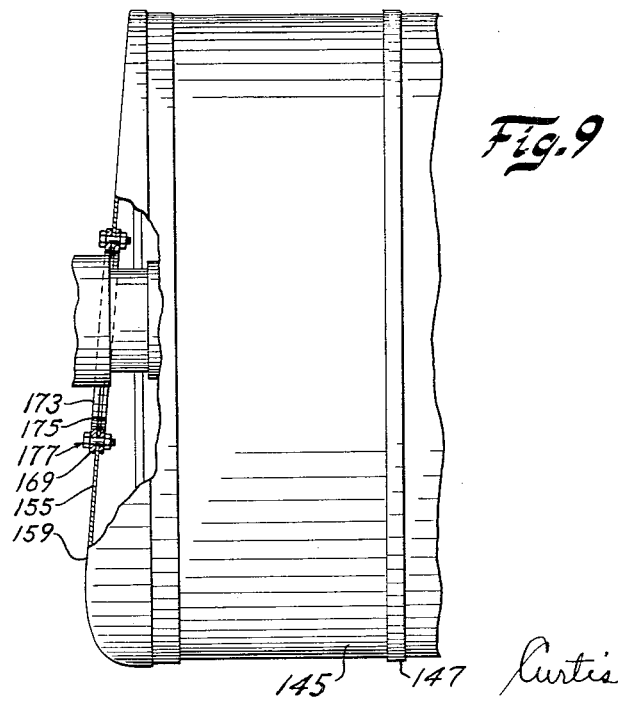
INVENTOR.
Crosby Field
BY
Curtis, Morris & Safford
ATTORNEYS

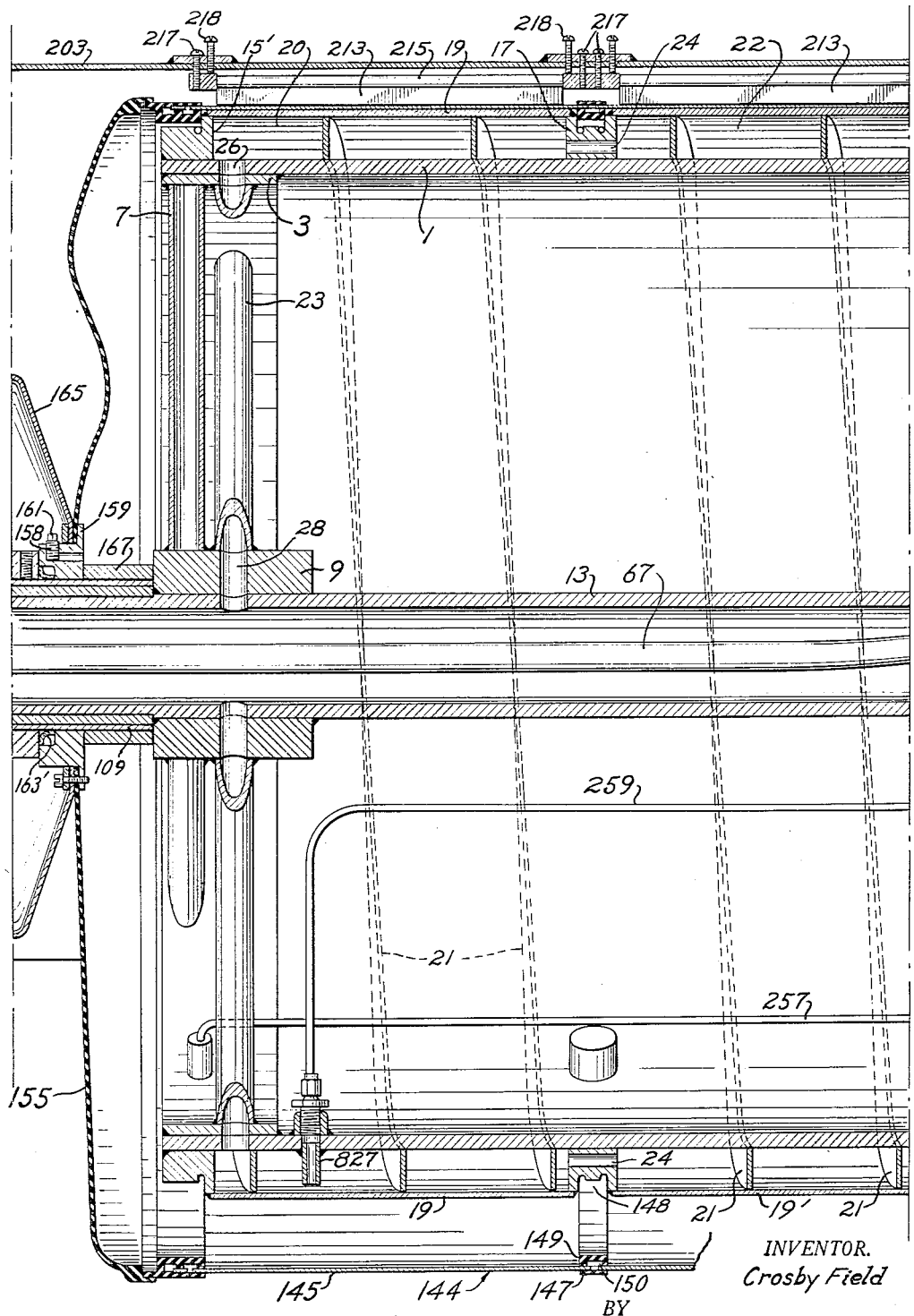

May 22, 1956 C. FIELD 2,746,263
CONGEALED PRODUCT AND APPARATUS AND MEANS FOR MAKING SAME
Filed Dec. 13, 1951 18 Sheets-Sheet 6

INVENTOR.
Crosby Field
BY
Curtis, Morris + Safford
ATTORNEYS

May 22, 1956 C. FIELD 2,746,263
CONGEALED PRODUCT AND APPARATUS AND MEANS FOR MAKING SAME
Filed Dec. 13, 1951 18 Sheets-Sheet 9
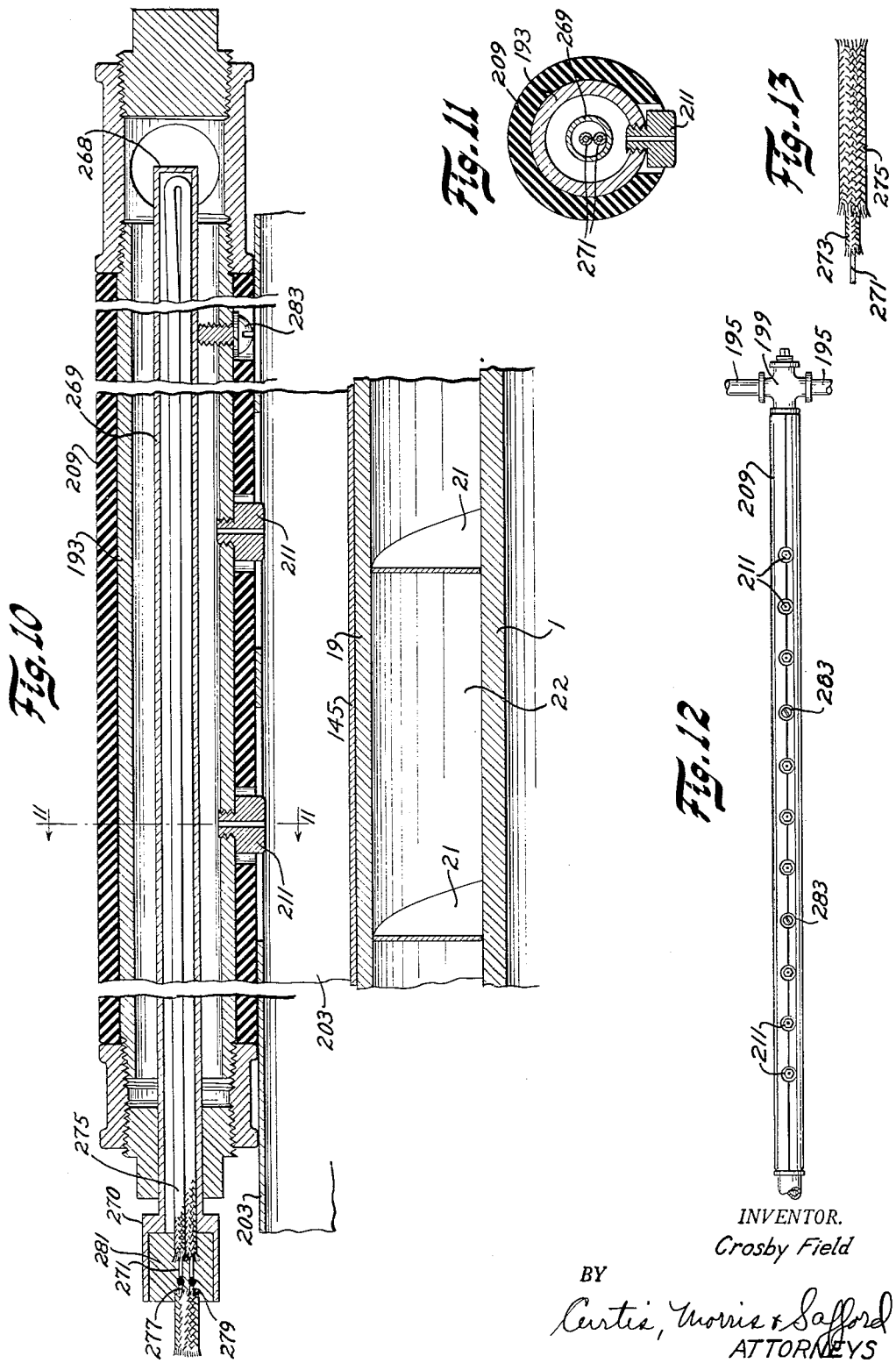
INVENTOR.
Crosby Field
BY
Curtis, Morris & Safford
ATTORNEYS

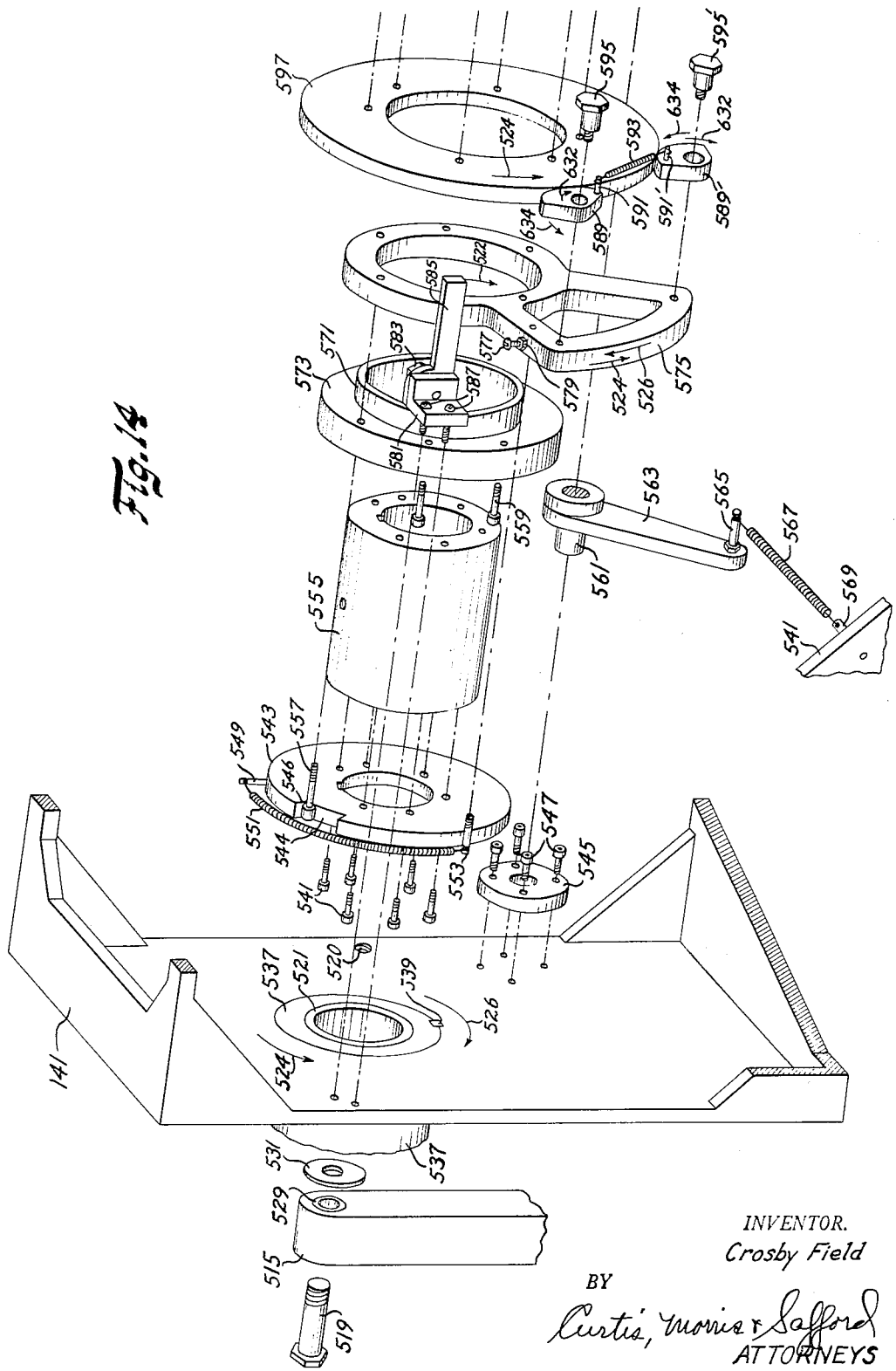

May 22, 1956  C. FIELD  2,746,263
CONGEALED PRODUCT AND APPARATUS AND MEANS FOR MAKING SAME
Filed Dec. 13, 1951  18 Sheets-Sheet 11

INVENTOR.
Crosby Field
BY
Curtis, Morris & Safford
ATTORNEYS

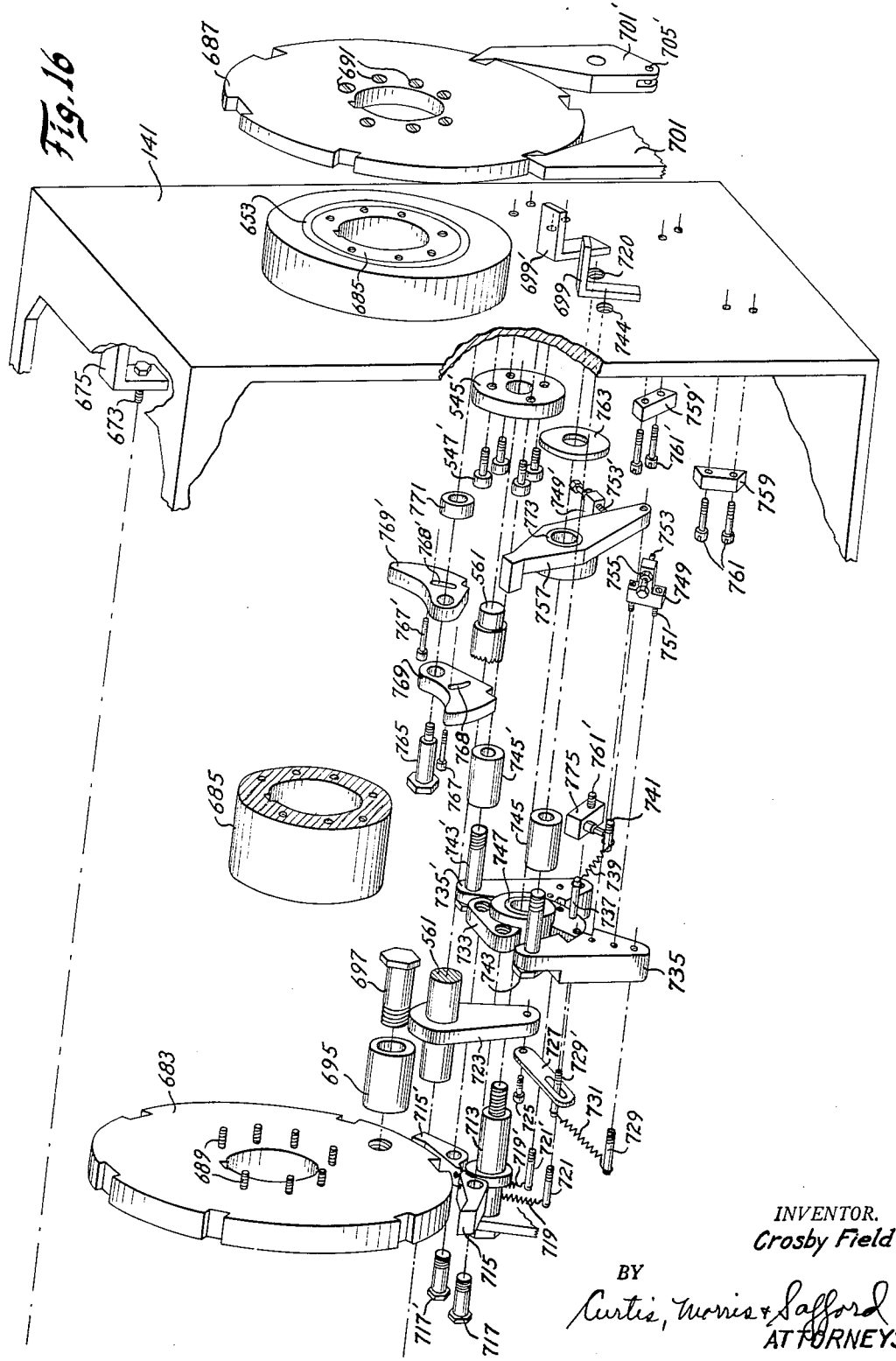

May 22, 1956 C. FIELD 2,746,263
CONGEALED PRODUCT AND APPARATUS AND MEANS FOR MAKING SAME
Filed Dec. 13, 1951 18 Sheets-Sheet 13
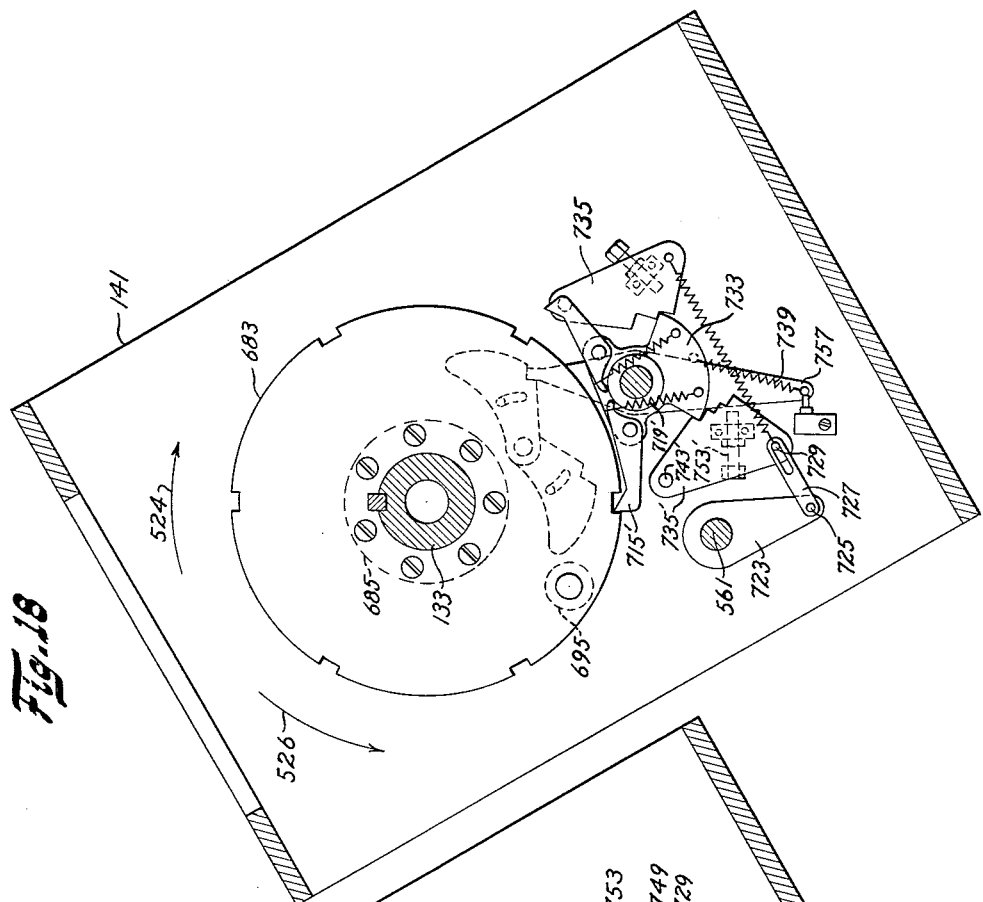
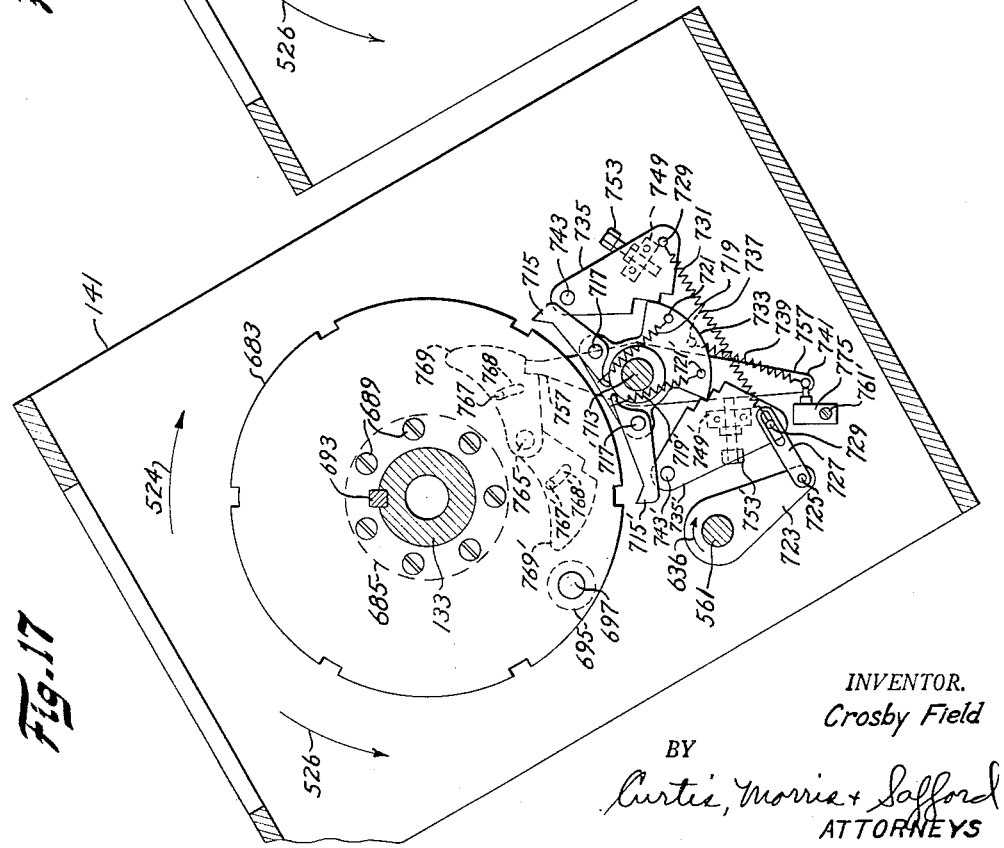
INVENTOR.
Crosby Field
BY
Curtis, Morris & Safford
ATTORNEYS May 22, 1956  C. FIELD  2,746,263
CONGEALED PRODUCT AND APPARATUS AND MEANS FOR MAKING SAME
Filed Dec. 13, 1951  18 Sheets-Sheet 14
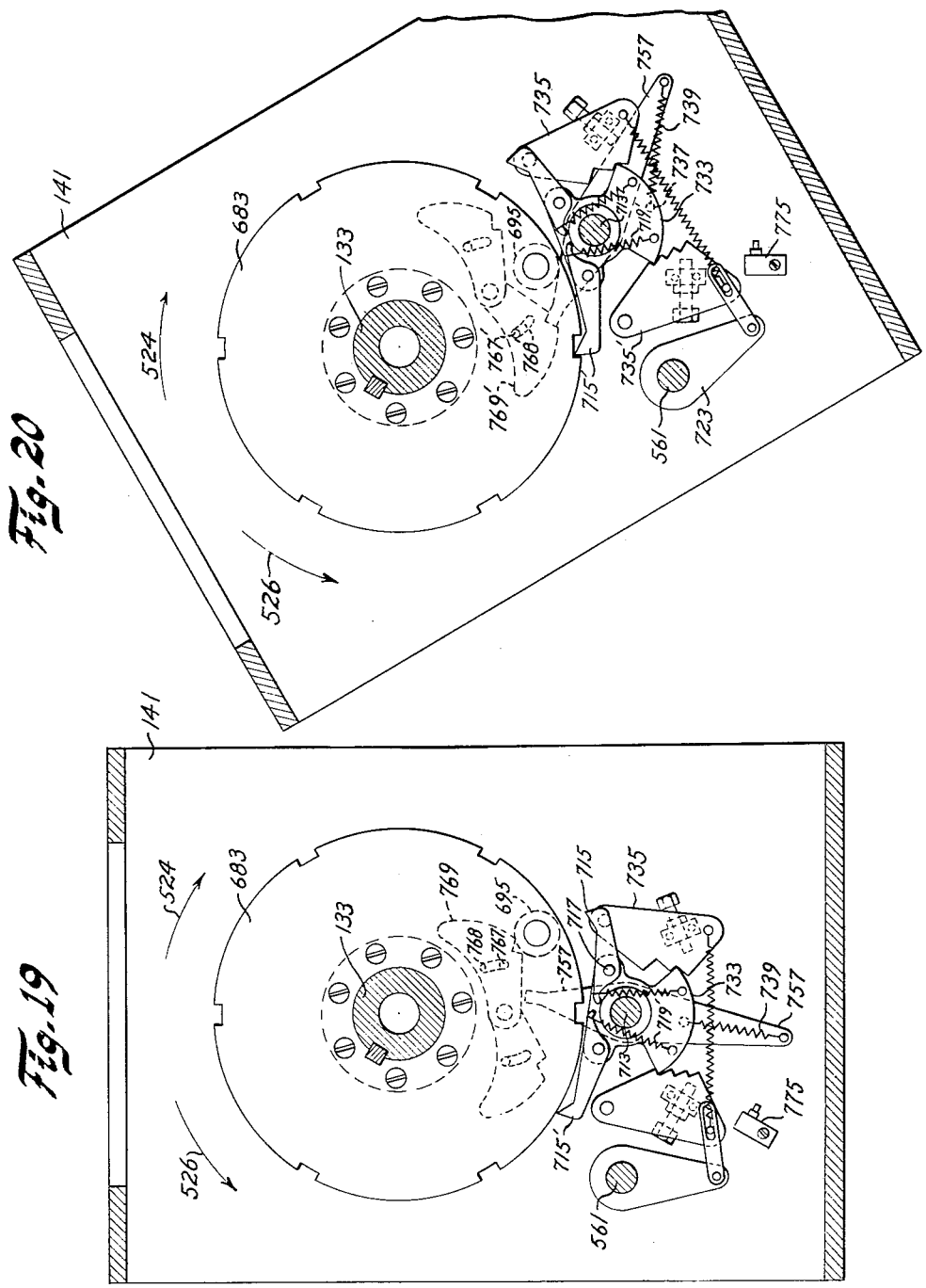
INVENTOR.
Crosby Field
BY
Curtis, Morris & Safford
ATTORNEYS May 22, 1956 C. FIELD 2,746,263
CONGEALED PRODUCT AND APPARATUS AND MEANS FOR MAKING SAME
Filed Dec. 13, 1951 18 Sheets-Sheet 15
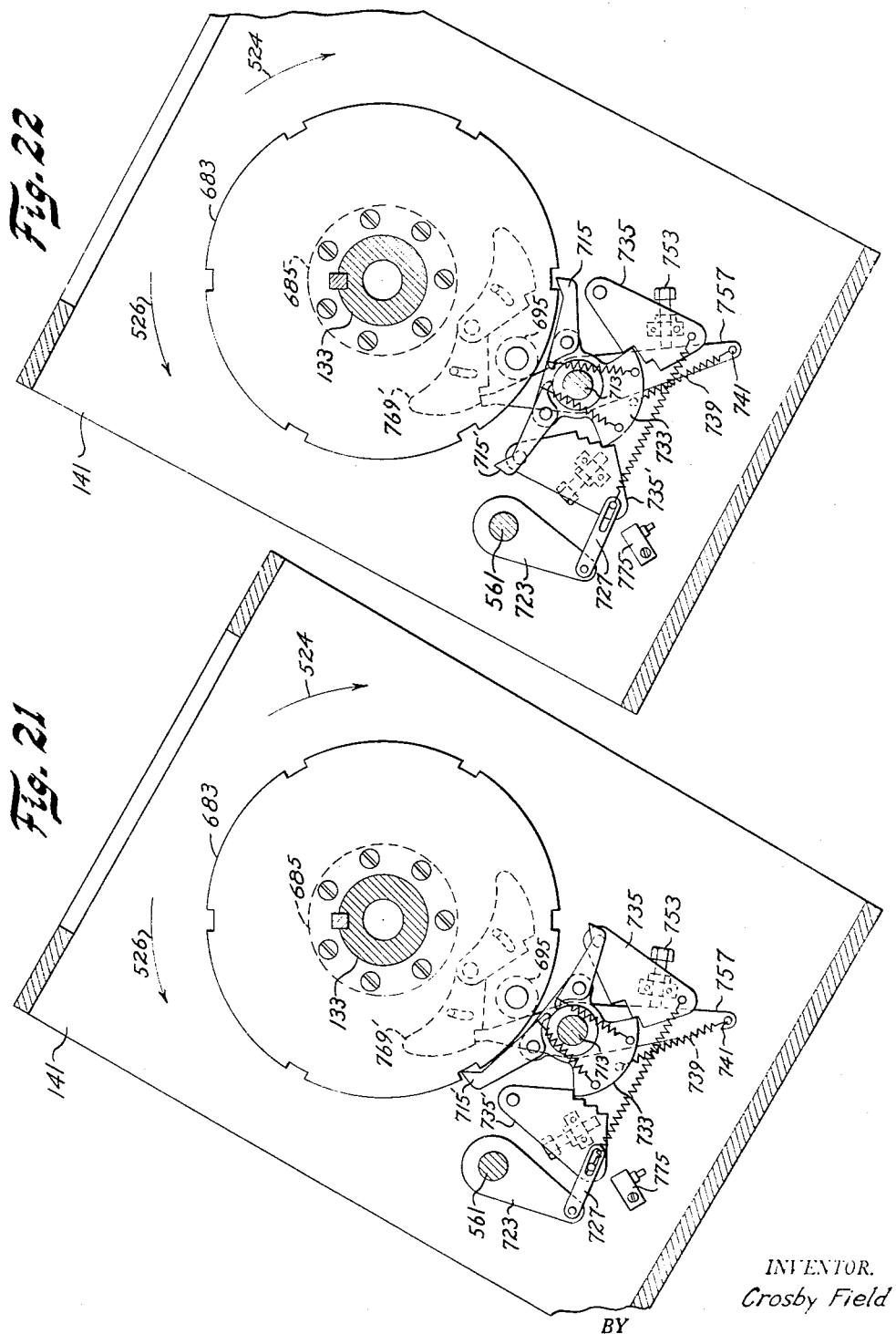
INVENTOR.
Crosby Field
BY
Curtis, Morris + Safford
ATTORNEYS May 22, 1956 C. FIELD 2,746,263
CONGEALED PRODUCT AND APPARATUS AND MEANS FOR MAKING SAME
Filed Dec. 13, 1951 18 Sheets-Sheet 16
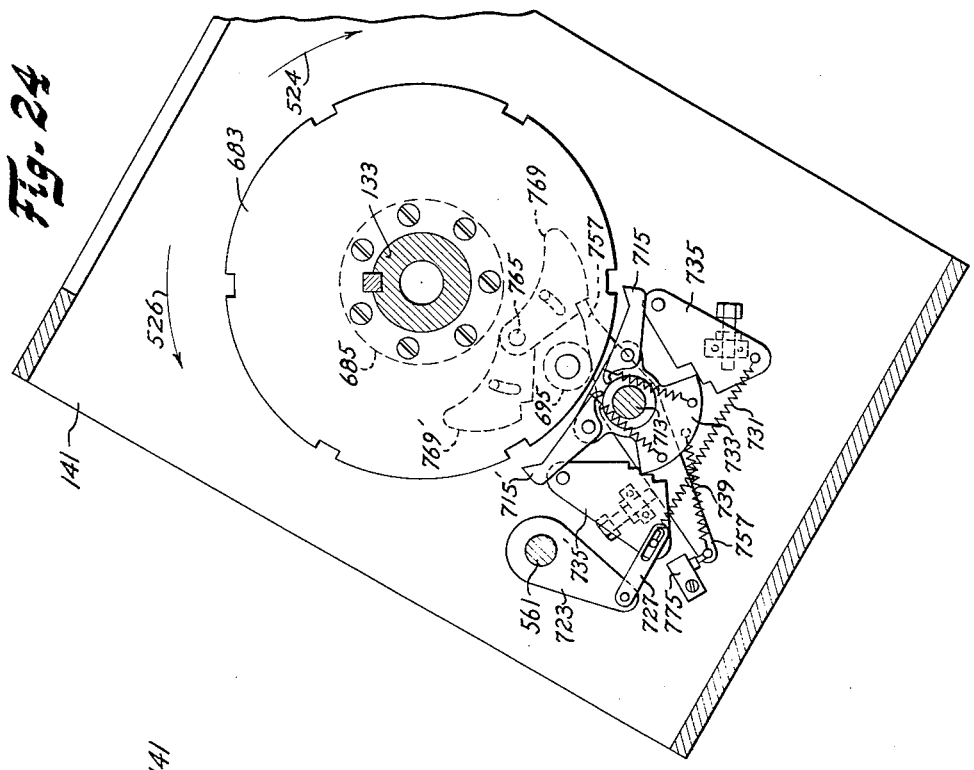
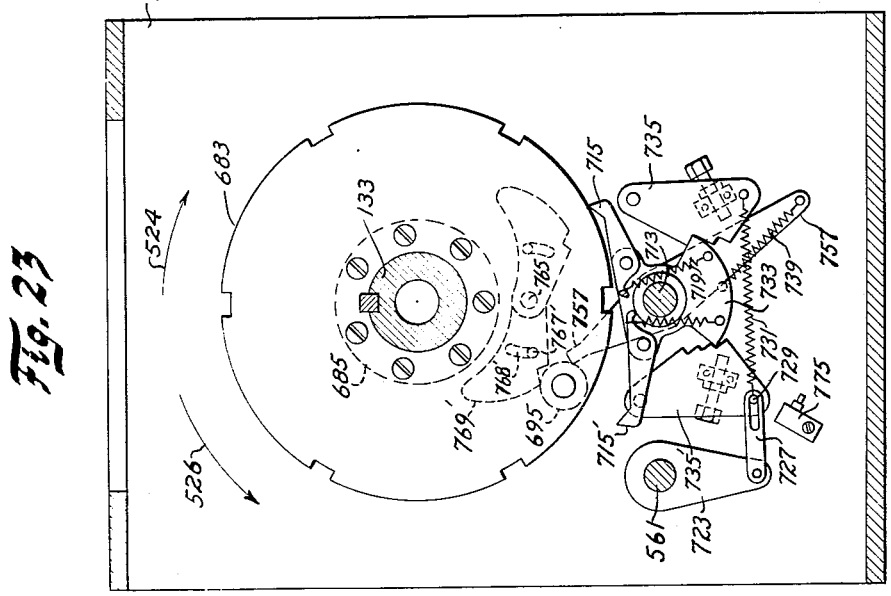
INVENTOR.
Crosby Field
BY
Curtis, Morris + Safford
ATTORNEYS May 22, 1956 C. FIELD 2,746,263
CONGEALED PRODUCT AND APPARATUS AND MEANS FOR MAKING SAME
Filed Dec. 13, 1951 18 Sheets-Sheet 17
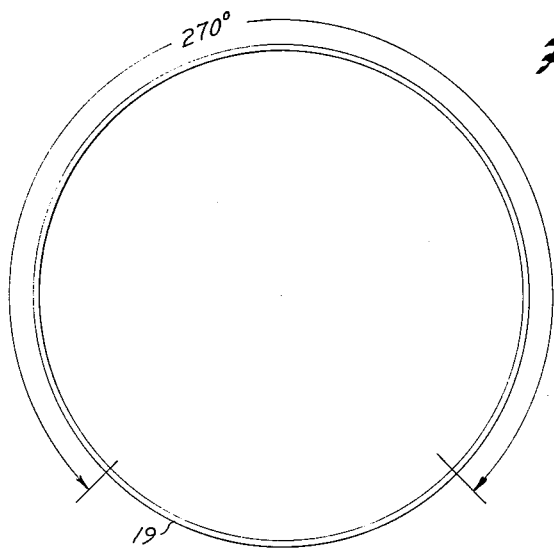
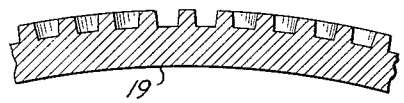
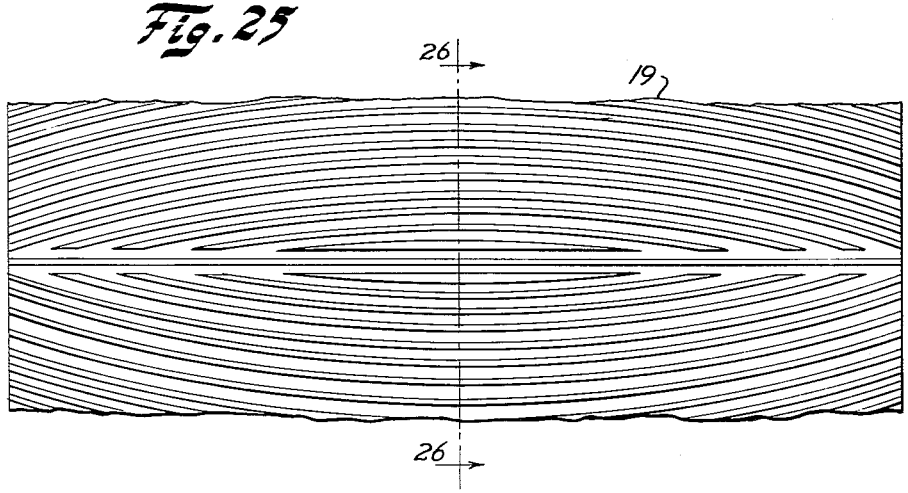
INVENTOR.
Crosby Field
BY
Curtis, Morris & Safford
ATTORNEYS

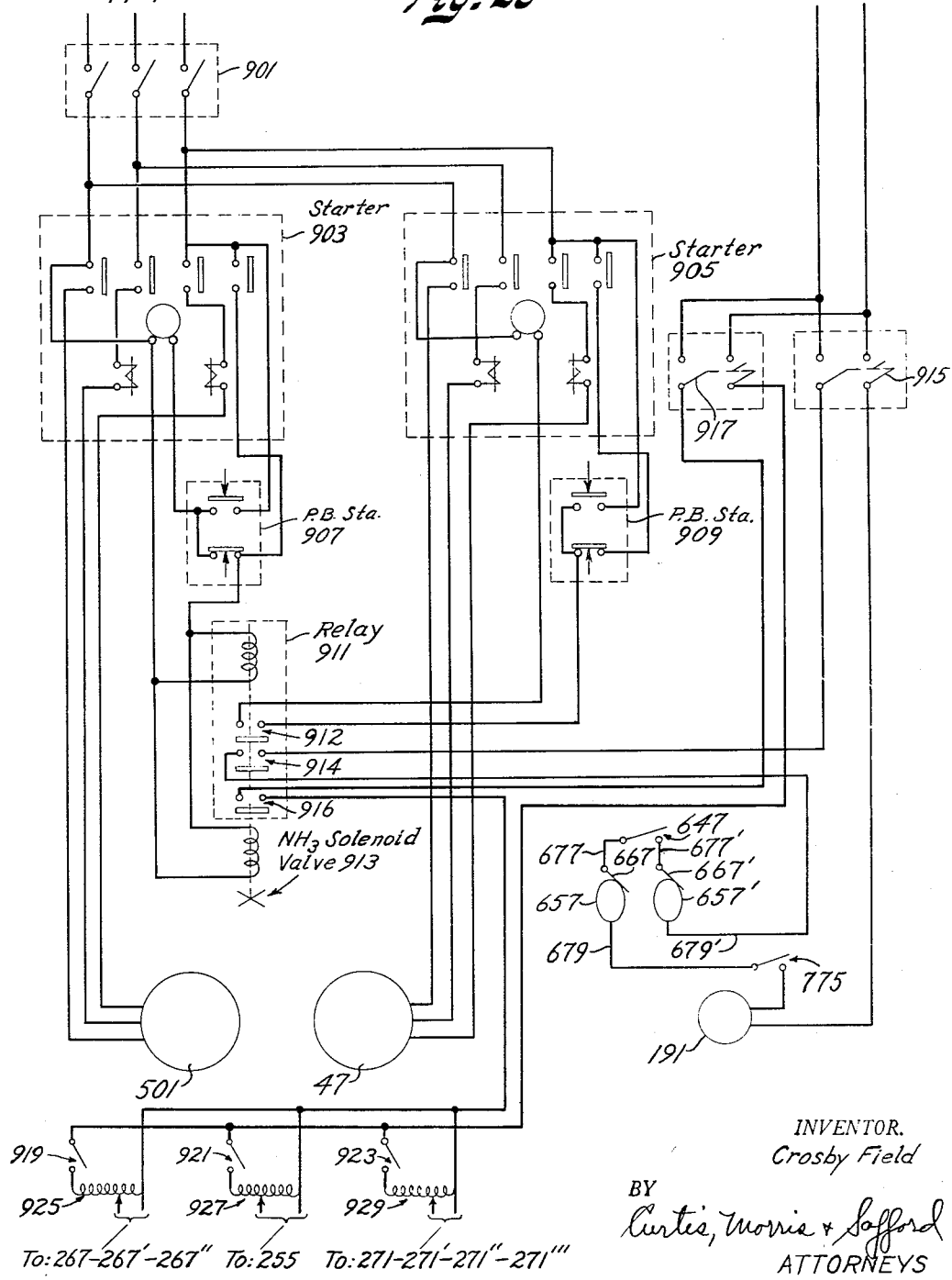

United States Patent Office 2,746,263
Patented May 22, 1956

2,746,263

CONGEALED PRODUCT AND APPARATUS AND MEANS FOR MAKING SAME

Crosby Field, Brooklyn, N. Y.

Application December 13, 1951, Serial No. 261,526

22 Claims. (Cl. 62—7)

It is an object of this invention to congeal liquids into relatively thin, wide and long frozen strips. It is a further object of this invention to impart to such frozen liquid strips any desired temperature below freezing points of such liquids. It is still a further object of this invention to produce a frozen product or ice of a substantially constant temperature melting point from a salt solution of any concentration not the eutectic. It is also an object of this invention to produce a product of substantially a constant melting point from a solution containing one or more materials of different percentages of concentration therein. It is still a further object of this invention to economically congeal liquid comestibles, such as cream, citrus fruit juices in a form suitable for relatively long storage without deterioration. Another object of this invention is to make a machine which is applicable to a wide variety of kinds of liquids being frozen and readily adjustable for differences in their thermal and physical characteristics, and in the desired degree of subcooling. It is a further object of this invention to obtain the necessary peeling of the frozen product from the surface on which it has been frozen without the use of deflection rollers which are relatively expensive and liable to produce undue and damaging strains in the flexible surface. It is a further object of this invention to make a quick freezing machine for liquids containing many improvements in features of construction, which will become obvious from perusal of the specification.

One of the objectives obtained by my invention is the practical manufacture of a substantially constant melting point frozen product, which product is not the solid phase eutectic solution of one or more salts or chemicals. When such a solution is frozen by contact with a sufficiently cold surface, the first thin film is of the concentration of the liquid phase. As this film has a poor rate of heat transfer, the next layer frozen is congealed at a slower rate, with the result that the frozen portion has a concentration less than the concentration of the liquid. The thicker frozen layer has a still lower rate of heat transfer, with the result that the difference in salt or chemical concentration between the liquid and solid phases becomes still greater and this difference grows progressively larger as freezing continues. If the solution be held in a can such as is common in a commercial ice plant, the final result is a "core" of concentrated salt solution.

I have frozen thick slabs of salt solutions, and found that the melting point of such a slab varies greatly as it melts, probably because melting is a surface phenomenon, and the composition of the surface of the slab or cake varies as the thickness becomes less.

In the preservation of fish, certain fruits and vegetables, it is desirable to hold them at a temperature as near their freezing points as possible, yet not to injure them by actually freezing them. By so holding them destructive enzymic action is reduced and bacteriological deterioration retarded. To accomplish this purpose an accurately controlled melting point ice is required.

By the means described hereinbelow, I obtain a homogeneous frozen product because at any given time the only unfrozen liquor present to-be-frozen is present in an extremely thin layer which is frozen completely before additional liquor-to-be-frozen is brought anywhere near the freezing surface. Thus the liquor-to-be-frozen is added to the frozen coating in infinitely thin increments, each of which is frozen before another increment is supplied.

The invention accordingly consists of new products, methods and apparatus for producing them, features of construction, combinations of elements, arrangement of parts and in the several steps and relation and order of each of the same to one or more of the others, all as will be illustratively described herein, and the scope of the application of which will be indicated in the following claims.

In the drawings in which are shown several of the many embodiments of the invention:

Figure 1a is a view illustrating nozzles for supplying liquor directly over the area where the metallic panels are bonded to the rubber portion of the freezing cylinder;

Figure 3 is the drive end of the machine;

Figures 4, 5, 6 and 7 are sectional elevations which collectively show a longitudinal section through the axis of the machine;

Figure 9 shows an alternate construction of the flexible end portions of the freezing cylinder;

Figure 10 is a fragmentary longitudinal sectional view of a liquor feed pipe;

Figure 11 is a cross sectional view taken along the line 11—11 of Figure 10;

Figure 12 is a bottom view of one of the feed pipes;

Figure 13 is a fragmentary view of the electrical heating resistor;

Figure 15:
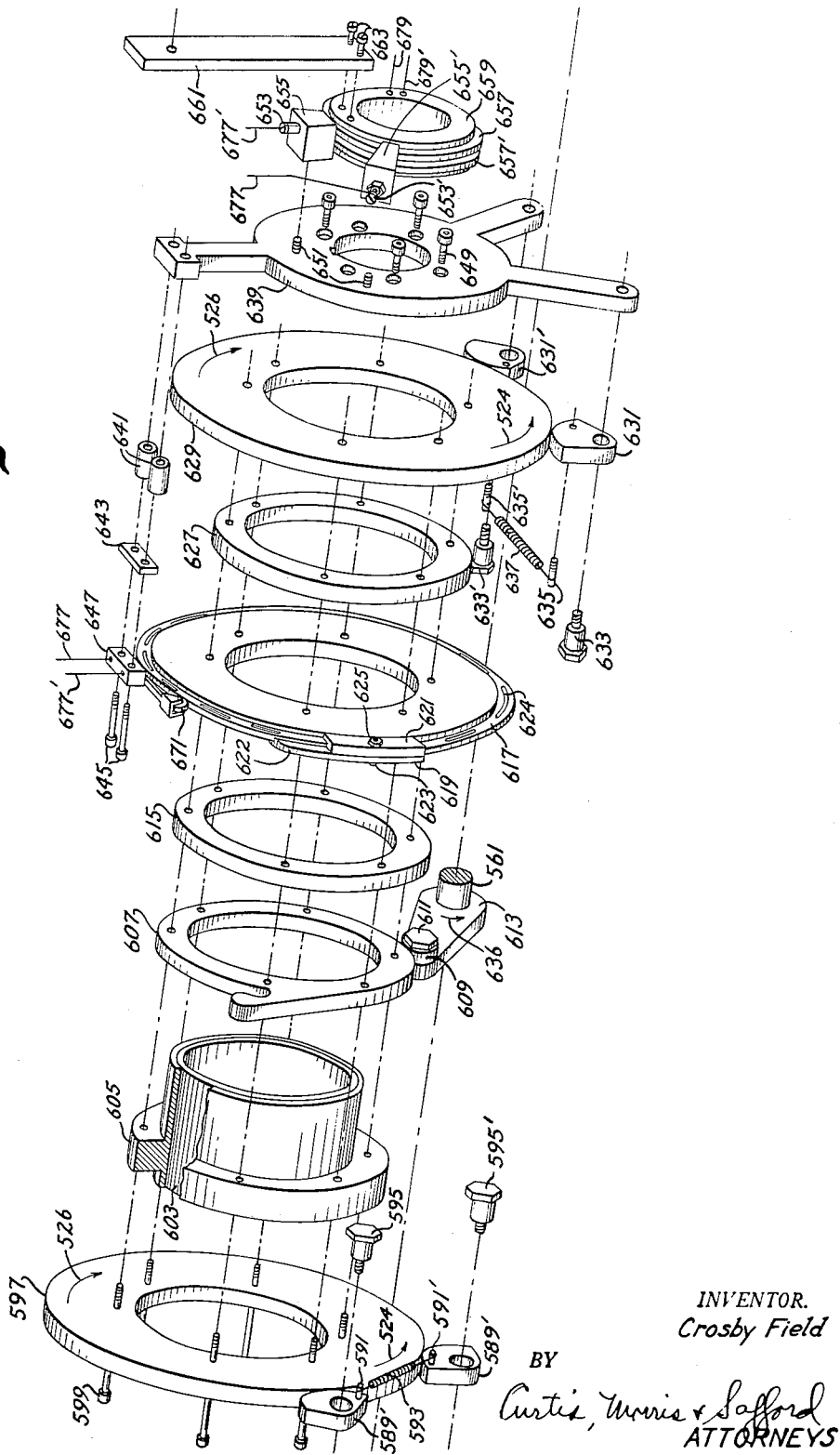

Figures 14, 15 and 16 altogether show an exploded view of the Timing Mechanism;

Figures 17, 18, 19, 20, 21, 22, 23 and 24 are views showing several operating positions of the harvesting part of the Timing Mechanism;

Figure 25 is a fragmentary plan view of the top of the evaporator of one embodiment of my invention, showing grooves in the outer surface;

Figure 26 is an enlarged section taken along line 26—26 of Figure 25;

Figure 27 is a diagrammatic view showing that portion of the evaporator outer surface containing grooves; and Figure 28 is a schematic electrical wiring diagram.

*The evaporator*

The evaporator (see particularly Figures 4, 5, 6 and 7), comprises an inner shell 1 to which are welded at either end spider rings 3 and 5. These are carried upon spokes 7 attached to hubs 9 and 11. Hubs 9 and 11 in turn are attached by welding to the main shaft 13 so that whenever it rotates, the evaporator will rotate with it. At the ends of the inner shell 1 are welded end rings 15 and 15' and intermediate thereto are welded a number of spacer rings 17 and 17' to the exterior of which are welded stainless steel or other non-corrosive metal bands 19, 19' and 19''.

A space 20 is thus formed between the inner shell 1 and the outer metal bands or hoops 19. To the inner shell 1 is welded a steel flange 21 in the form of a helix so that a helical passage 22 is formed from one end of the evaporator jacket to the other end through which passage or channel refrigerant flows.

In order that an unrestricted passageway for the refrigerant may be provided through the spacer rings 17 and 17', a series of holes 24 are drilled longitudinally through the rings 17 and 17'. The number of holes and the cross sectional area of each hole are so proportioned that the aggregate area thus formed is approximately equal to the cross sectional area of the helical passageway 22.

At one end of the evaporator is a series of curved suction connectors 23. A passageway 26 connects the space 20 with the connector 23 and the connector 23 in turn discharges into the hollow shaft 13 through passageway 28 in hub 9.

To one end of the shaft 13 is attached an insulator bushing 107 and over this is pressed the metal sleeve 109, rotatably carried by the insulated bushing 119 in the main bearing 111, which in turn is supported on the main bracket 113. The latter is attached to the main crosstie 115 which rests on the bed rails 117 and 117'. Access for lubrication is provided by hole 120 and sealed by oil seals 130 and 130'. A band or ring of anti-friction metal 127 permits rotation between the thrust cap 65 and the housing 57. Cap 65 is secured to plug 69 by screws 129. The main connection housing 57 is supported by brackets 131 attached to bed rails 117 and 117'.

The other end of shaft 13 is extended by shaft insert 133 (Figure 6) to which is welded hub 11 which in turn carries the spokes 7 at the outer ends of which is attached the spider ring 5 as above-described. Insulator sleeve 135 is attached to the shaft insert 133 and metal sleeve 137 forced over it. Sleeve 137 is rotatably carried by insulator bushing 139 in main bearing 111', similar in all respects to the main bearing 111, hereinabove-described, and fastened to the main frame in the same fashion.

Figure 1:
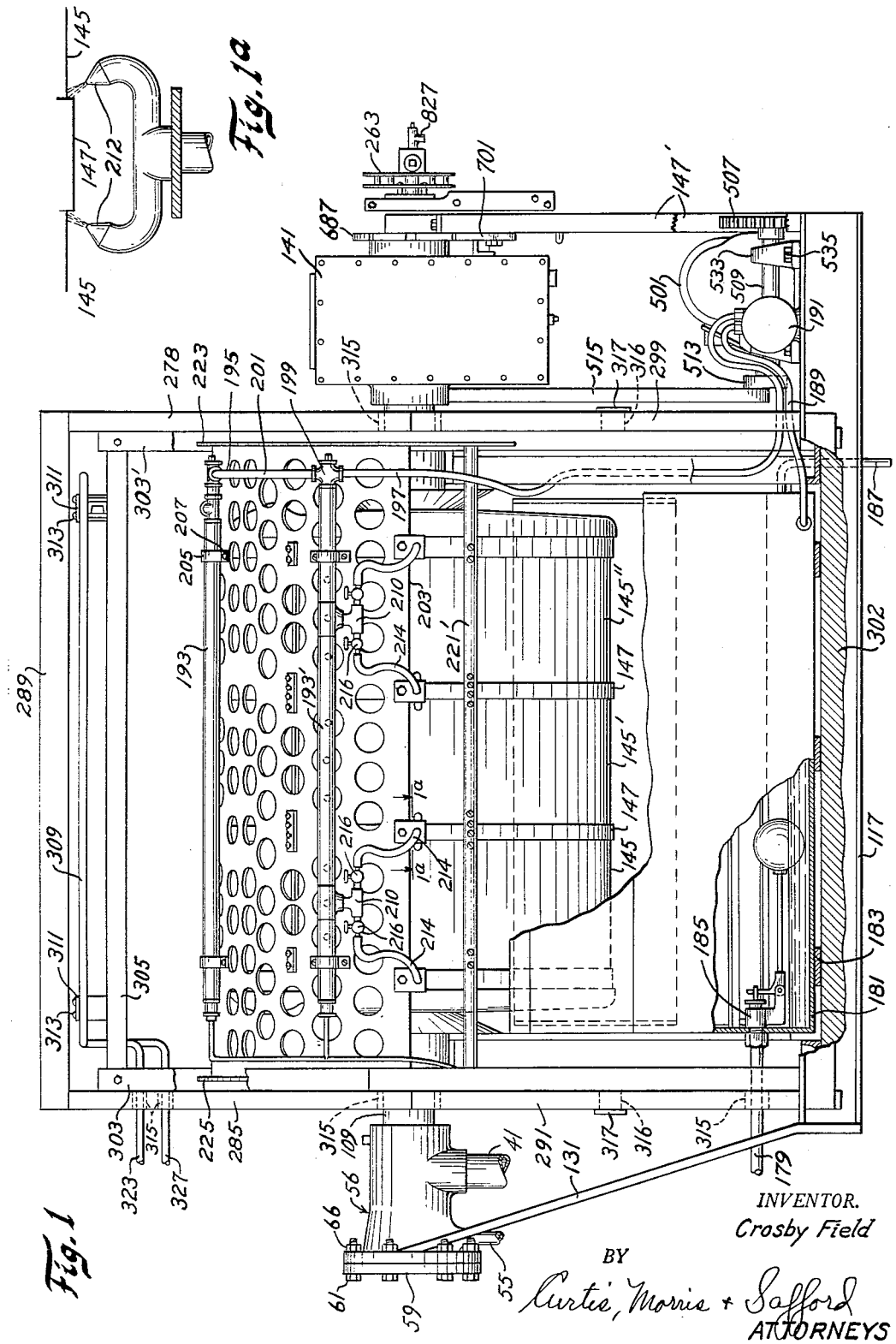
Figure 1 is a view of the machine with substantially all the back outside wall removed to show the interior and portions of the frozen ribbon chute and liquid feed tank also removed.

Shaft insert 133 carries the timer box 141 which, together with its contents, will be described more in detail hereinbelow, and in turn is carried by the anti-friction bushing 143 of the bearing 145 supported on the bracket 147', attached to bed rails 117 and 117' (Figure 1).

*The refrigerant circuit*

Figure 2:
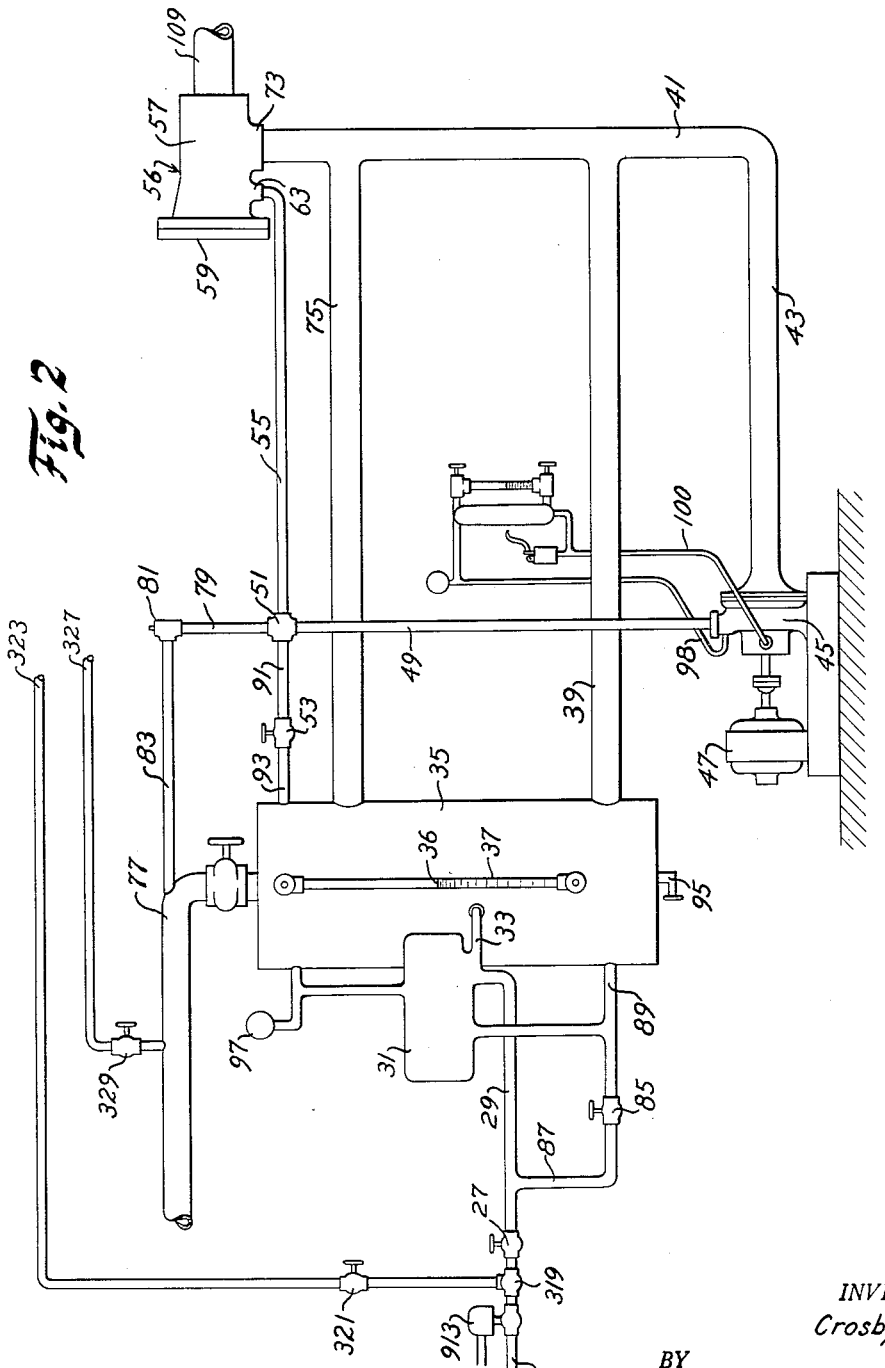
Figure 2 shows the refrigerant piping external to the machine.
Figure 6:
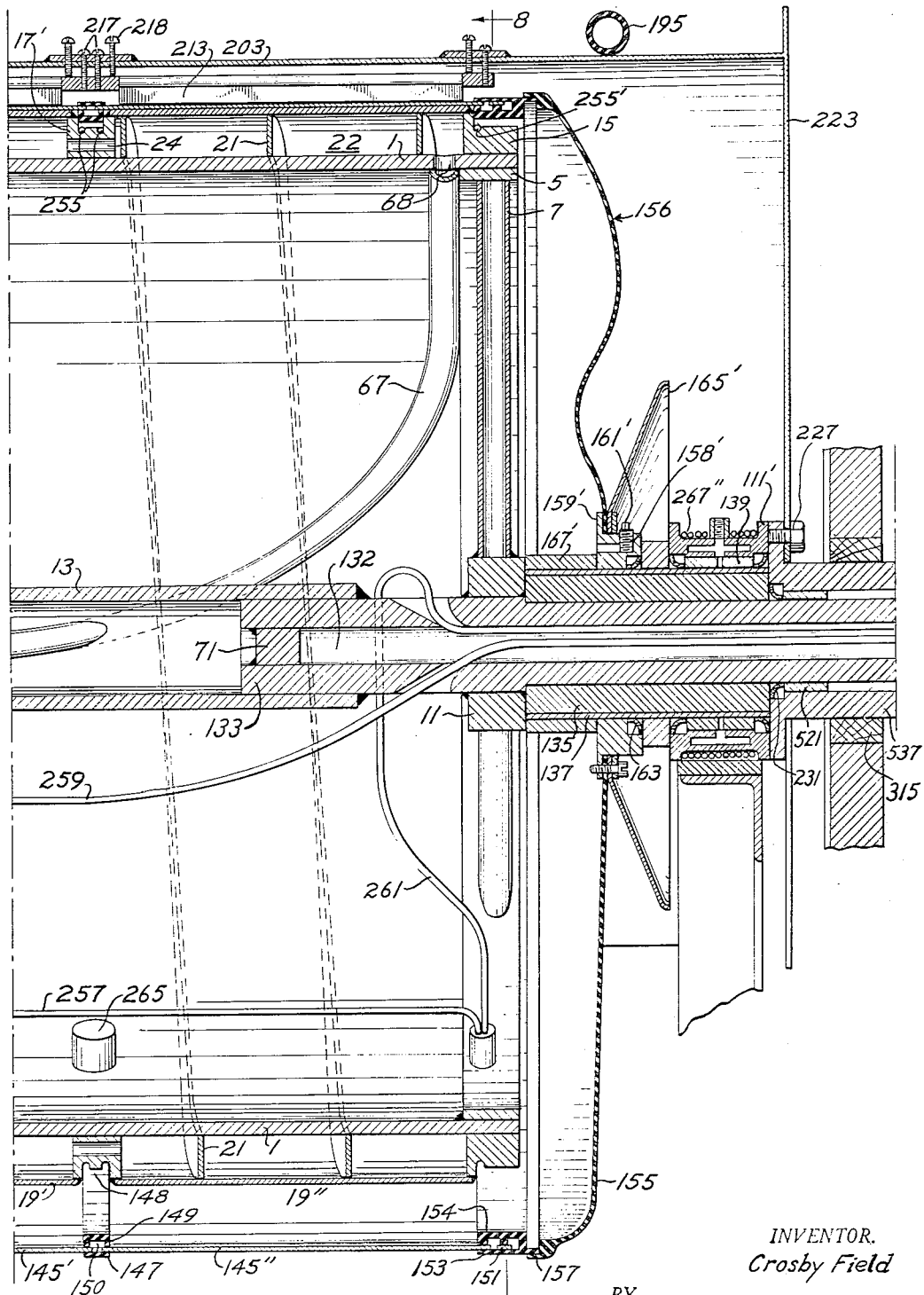

Referring now to Figure 2, liquid refrigerant such as anhydrous ammonia flows from the receiver of a "high side" or "compressing unit" (not shown) through conduit 25, opened valve 27, conduit 29, float valve 31, conduit 33 into vertical receiver 35, in which the liquid is held by float valve 31 at level 36 in gage glass 37, an operation well known in the art, hence unnecessary to describe further herein. The liquid refrigerant then flows through conduits 39, 41 and 43 to suction of pump 45 which is driven by motor 47. Conduit 49 conveys the liquid refrigerant to tee 51, and as valve 53 is normally closed, the refrigerant flows through conduit 55 to the end connection 56, which includes a housing 57 and a blank flange 59 (see Figure 4), held to the housing 57 by bolts 61 and nuts 66.

Conduit 55 discharges into the chamber 62 through nipple 63 welded to housing 57, thence through hole 64 in thrust cap 65. Conduit 67 welded at one end to plug 69 and at the other end to inner shell 1 (Figures 5 and 6), provides a passageway for the liquid refrigerant to flow from chamber 62 through hole 64 in thrust cap 65 and a hole in plug 69 to the helical passageway 22 through hole 68 in the inner shell 1. Where conduit 67 passes through the wall of main shaft 13, it is brazed or welded to it so that the vapor refrigerant in the interior of main shaft 13 may not escape.

As heat is absorbed through the outer shell bands 19, 19' and 19'', the refrigerant volatilizes in its passage in the helical path through the channel 22, the holes 24 and the vapor and any liquid not volatilized continue through holes 26 into suction connectors 23 through holes 28 into hollow central shaft 13. As it cannot escape through the end closed by plug 71, it must flow through holes 72 into chamber 74 in housing 57, thence it flows through nipple 73 into conduit 41 (Figure 2), the liquid continuing back into the pump for recirculation and the vapor being carried by conduit 75 back to receiver 35. Any liquid which has not been separated previously remains in the receiver 35, but the vapor passes off through conduit 77 to the suction of an ammonia compressor (not shown). Tee 51 has a conduit 79 connected to a relief valve 81, which should the refrigerant pressure become too great, will open and discharge into conduit 83, connected which in turn discharges into conduit 77.

Float valve 31 can be bypassed by opening valve 85 between conduits 87 and 89. The machine may be bypassed by opening valve 53 between conduits 91 and 93; the system drained by closing valve 27 and opening valve 95 and the pressure in the system indicated by gage 97, all of which is common operating practice and forms no part of the invention described herein; neither does the pump oiling system shown by the conduits 98 and 100 and the apparatus connected thereto, hence will not be further described herein.

Seals 99 and 121 are provided to prevent leakage between the high and the low pressure refrigerant, and seal 101 is provided to prevent the leakage of the refrigerant to the atmosphere. Seal 121 is held by seal ring 123, fastened to housing 57 by screws 125. The thrust on the shaft 13 due to differences in pressure existing between the high pressure and the low pressure refrigerant is borne by the anti-friction bearing 103. This bearing 103 may be lubricated through a hole 104 in the housing 57 sealed by plug 105.

*The flexible freezing belt*

About the outer shell 19 of the evaporator is wrapped the flexible freezing cylinder or belt 144. This consists of a number of seamless metallic freezing panels 145, 145' and 145'' (Figures 5 and 6) each of the same diameter, but the inside diameter of which is somewhat greater than the outside diameter of the outer shell 19 of the evaporator, so that when partly filled with a lubricating and heat transfer liquid 171, they take the shape illustrated in Figure 8. I have found propylene glycol a satisfactory liquid for this purpose and may use it or a solution containing it, but I have used other solutions and do not limit my invention solely to said solution.

The freezing panels are joined together to form a single belt by interior and exterior rubber or similar plastic strips 147 and 149 bonded to the metal panels 145, 145' and 145'' as is known in the art. Each interior strip 149 is thicker than its corresponding exterior strip 147, and has a groove 150 into which project the edges of the metal panels 145, 145' and 145''. This prevents any slight "beading" of the edge due to operation, which bead would seriously decrease the service life of the panel. The width of each such interior rubber 149 is slightly less than the width of the groove 148 in the spacer rings 17 and 17' so that as the cylinder rotates or oscillates, the sides of the grooves 148 will not obstruct the free seating of the panels 145, 145' and 145'' on the outside surfaces of the outer shell panels 19, 19' and 19'', but instead, the sides of the grooves 148 guide the interior rubber, thus causing the cylinder to properly seat itself and substantially preventing longitudinal movement.

By means of a similar construction narrow non freezing bands 151 called "tear bands" are bonded. These have the same diametral dimensions as have the freezing panels 145, 145' and 145'', but are entirely covered by the exterior rubber strip 153. On the interior of the bands 151 are bonded rubber strips 154, which are so placed that as the cylinder rotates they also help guide the cylinder by sliding into the half-grooved portions of end rings 15 and 15'.

To the exterior rubber strip 153 is cemented the apron 155 by means of rubber flap 157. Sufficient slack is left in the apron 155 as shown at 156 so that it may accommodate itself to the shape created by the weight of the fluid held within itself without putting any substantial strain upon the metal panels 145, as will be described further hereinbelow.

The inner edge of the apron 155 is held in rings 159—159' free to turn on sleeves 109—137 respectively, lubrication for which is provided through holes 158 and 158' normally closed by plugs 161 and 161', and controlled by seals 163 and 163'. Apron guards 165 and 165' are attached to rings 159 and 159', respectively, the function of which guards is to prevent the apron from catching on the frame or other parts as the cylinder rotates. Spacer collars 167 and 167' prevent longitudinal travel towards the middle of the apron rings 159 and 159'.

Under certain operating conditions it will be found advantageous to use the cheaper construction shown in Figure 9. In this embodiment I have eliminated the more expensive apron rings 159 and 159', seals 163 and 163', and their attendant cooperating parts. Instead I use a floating ring 169 to which the apron 159 is attached.

The inner diameter of this ring 169 is larger than the outside diameter of the shaft 133 so that it can take the position approximately illustrated under the influence of the liquid 171 and the constraining surface of the evaporator outer shells 19, 19' and 19". As the cylinder and the evaporator turn, ring 169 permits the free flexing of the cylinder and its aprons maintaining the liquid 171 in the bottom of the cylinder as the panels carry up into contact with the evaporator shell a film of the liquid 171. I may make this ring 169 of two similar parts, 173 and 175, clamped together with the apron 159 between them, and held together by bolts and nuts 177.

In order to assure the proper thickness of liquid film between the inner surface of the freezing panel 145, 145' and 145", and the exterior of the outer shell 19, 19' and 19", I may roughen the exterior of the latter by sandblasting, shot peening, or preferably, serrate it by numerous grooves, approximately parallel to the horizontal axis of the machine, or these grooves may be as shown in Figures 25 and 26. In this embodiment on that portion of the evaporator that is on top during the freezing part of the cycle, the grooves are straight, parallel and horizontal; on the sides the grooves are slightly curved, the lowest point of each groove is approximately at the middle of each panel.

*Circulating system for liquid to be frozen*

Figure 8:
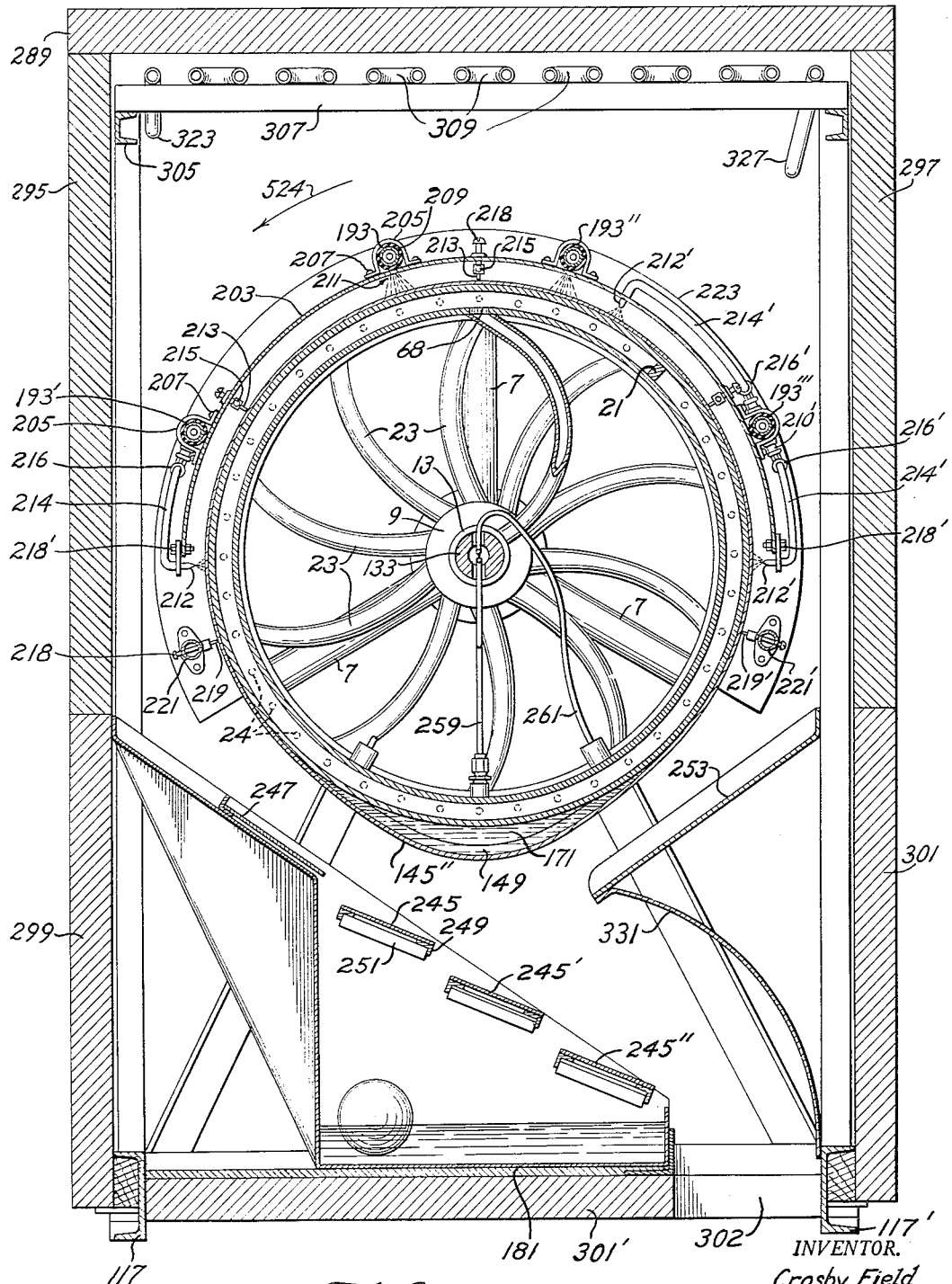
Figure 8 is a transverse sectional view taken as indicated by the line 8—8 of Figure 6.

This product which may be water or a salt solution or other chemical is termed for purposes of this paper "liquor" (see Figures 1 and 8). The liquor to be frozen is fed from a source not shown through a conduit 179 into the liquor tank 181, supported by strips 183 on rails 117 and 117'. The level of the liquor in tank 181 is controlled by a conventional float valve mechanism 185 but in case for some unusual cause the liquor level in tank should rise too high, I provide an overflow conduit 187 to drain off any surplus liquor. Liquor to be frozen is taken from tank 181 through conduit 189 by pump 191 which is driven by a motor (not shown) and which delivers the liquor to a group of feeder pipes 193, 193', 193" and 193''', through a header conduit 195 and a flexible hose 197. For convenience in construction and cleaning at intervals, I may make this header 195 out of pipe fittings 199 and short curved lengths of pipe 201. Feed pipes 193, 193', 193" and 193''' are attached to a curved wiper support plate 203 by means of clamps 205 and screws 207. Between the clamp 205, the conduit 193 and the wiper support plate 203 are tubes of rubber or other heat insulating material 209 which surround each feeder pipe 193 and completely surround it except where the insulation is cut away to acommodate the liquor nozzles 211 and connections 210 and 210'.

The liquor to be frozen is fed to the metallic freezing panels 145, 145' and 145" of the flexible freezing cylinder 144 through nozzles 211 from feed pipes 193 and 193".

Nozzles 212 and 212' are secured to wiper support plate 203 by bolts 218' and adjusted to feed a stream of liquor directly over the area where the metallic panels of flexible freezing cylinder 144 are bonded to the rubber portion of this cylinder. The purpose of these nozzles 212 and 212' is to prevent the formation of ice at this point.

Nozzles 212 are connected by flexible tubes 214, pet cocks 216 and connections 210 to feed pipe 193'.

Nozzles 212' are connected by flexible tubes 214', pet cocks 216' and connections 210' to feed pipe 193'''.

The wipers 213 are strips of rubber or other elastic material, in length slightly less than the width of the freezing panel 145, and present one of their longitudinal edgewise surfaces to the exterior surface of the freezing panel. The opposite edge is bonded to a square or rectangular sectioned metal bar 215, which in turn is attached to the wiper plate 203 by adjusting screws 217, and held firmly in position by lock screws 218.

In order to save weight I may shorten the circular width of the wiper plate 203, and carry the end wipers 219 and 219' by attaching them to light pipes or tubes 221 and 221' which in turn are carried with the wiper plate 203 by attachment to its end plates 223 and 225 by similar adjustable screws 217 and lock screws 218.

End plate 223 is attached to hub 537 (see Figure 6) by cap screws 227. Hub 537 is an integral part of timer box 141 and oscillates with it, imparting an oscillatory motion to wiper plate 203 as it rotates on bushing 521 fixed on shaft insert 133 and is lubricated from the timer box 141 by holes 538. Seal 231 prevents the lubricant leakage at the other end of the bushing. At the other end wiper plate 203 is attached to end plate 225 which in turn is fastened to hub 233 by cap screws 235. This hub is free to oscillate on bushing 237 fixed on the main shaft 13. The bearing surfaces are lubricated by means of hole 236 in hub 233 closed by plug 239, and the lubricant is retained on the bearing surfaces between the seals 241 and 243.

If any liquor on the surface of the cylinder remains unfrozen, it will run down to the lowest point of the cylinder and then fall off of it onto the ice slides 245 and 245' whence it flows to the lower edges thereof and drops back into the liquor tank 181.

Ice slides 245, 245', 245" and 247 are made of a plastic, such as Bakelite, having a smooth top surface. They are supported by longitudinal angles 249 which in turn are fastened at each end to brackets 251, attached to the sides of the liquor tank 181. Any unfrozen liquor which may fall from the cylinder above its lower points is caught by shield 253 and drips off its lower edge following the same path as that described immediately hereinabove for the liquor dripping from the lowest point of the cylinder.

*Electrical heating system*

I have found from experience that long continued operation of a flexible surface comprising metal bonded to rubber from which metal a frozen product is peeled frequently cannot be had if certain liquors, such as ice frozen from commercially pure water, are permitted to freeze over the bond. The ice will slowly creep in between the rubber and the metal and eventually destroy the bond. In other inventions I have found ways of overcoming this difficulty, but in this embodiment I accomplish this result by liberating a small amount of heat where such "freezing over" may occur. This I accomplish by inserting electrical heating coils 255 in circumferential grooves in the spacer rings 17 and 17' and in the end rings 15 and 15', connecting these heater coils by means of electrical conductors 257, and carrying the main leads 261 through the central hole 132 in the shaft insert 133 to the wind up reel 263 which permits the taking up of slack wire as the evaporator turns through one complete revolution and back to its initial position. These leads are connected to a suitable source of electrical power (see Figure 28). Electrical bushings or pot heads 265 are provided within which the connection between the leads and the heating coil is made, and sealed by a bitumastic compound against moisture, as is well understood in the art.

In order to prevent the condensation of the moisture in the air seeping into the bearings and freezing, I also provide electrical heating coils 267, 267', and 267'', the electrical connections for which are also shown in Figure 28.

Still another part of the heating system is for the conditioning of the liquor prior to freezing, to keep its temperature and its characteristics dependent upon temperature under control throughout the operation. To accomplish this I insert (Figures 10 and 11), within the feed pipe 193 a tube 269 of suitable metal, closed at one end 268 and expanded or flared at the other end 270. Within this tube lies a U turn of electrical heating wire 271, protected from either grounding or short circuiting by a double layer of glass fibre insulation 273 and 275 (Figure 13). Connections to the electrical leads 277 and 279 are made in the flared end 270, which is then filled with a bitumastic or other self-sealing insulating plastic compound 281. Tube 269 is centered within feed pipe 193 by means of centering screws 283. The electrical connections are shown in Figure 28.

The insulated box

To reduce undesirable heat input to the machine I surround all cold parts with heat insulation, preferably in the shape of a panelled box. Each such panel 285, 287, 289, 291, 293, 295, 297, 299, 301 and 301' consists of a board of heat insulating material moistureproofed by impregnation of some such material as bitumin and covered on all sides with sheet metal. These panels are fastened by screws to the bed rails 117 and 117', cross rails 115, and to the uprights 303 and 303' of the supporting frame for the cooling coils, to be described hereinafter. A portion of the bottom panel is omitted to permit the flow of frozen material into a storage bin underneath the machine.

Cross pieces 305 supported by uprights 303 carry arms 307 to the top and bottom of which are clamped cooling conduits 309 by plates 311 and bolts and nuts 313. Through these cooling conduits flow any suitable refrigerant, thus maintaining the interior of the box cool, and confining the heat absorption by the refrigerant in the evaporator almost entirely to the task of freezing the liquor and subcooling it.

Any opening for pipes or shafting through any side, front, back or top panel is lightly sealed by gaskets 315 so as to prevent warm air infiltration. A series of peep holes 316 is provided in the panels for observation, but each such hole is sealed by a plug 317 of insulated material, when not in use.

Timing and harvesting mechanism

There are three phases to the operating cycle of the timing and harvesting mechanism. Substantially all of the timing and harvesting mechanism is enclosed in the timing box 141. During the first (freezing) phase the evaporator and flexible cylinder 144 on the central shaft 13 and 133 remain stationary while the liquid being frozen is supplied by the pump 191 to the nozzles 211 which oscillate with wiper support plate 203, as has been described hereinabove. During the second (subcooling) phase the pump is stopped but the continued contact of the frozen material with the heat transfer surface of the flexible belt still further reduces the temperature of said material. It remains off until the first phase begins again. During the third (harvesting) phase the central shaft 13 and 133, together with the evaporator and flexible cylinder, is turned in 60° steps through 360° rotation in one direction and then back 360° in the other direction, returning to the same rotational position for immediate repetition of the cycle. The detailed operation is described as follows:

Timing mechanism

Figure 7:
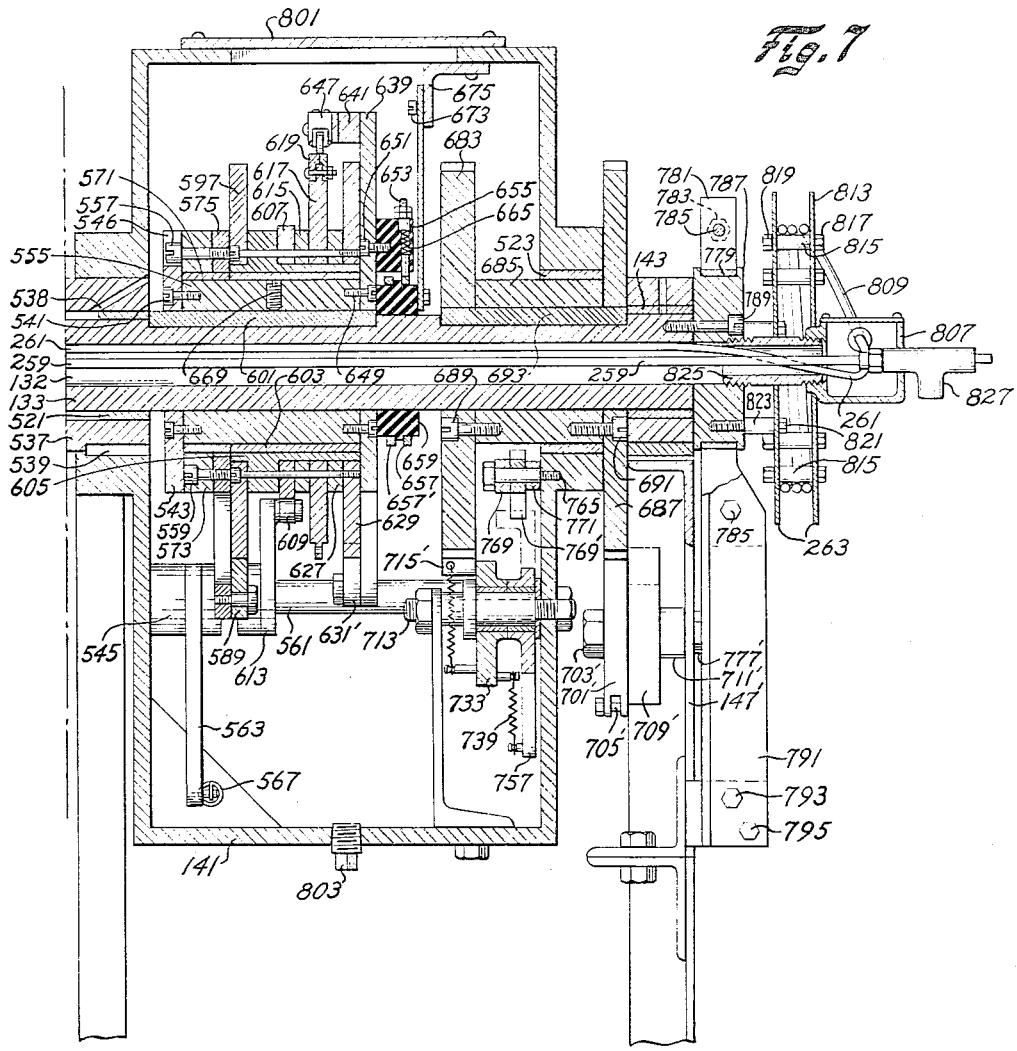

The timing mechanism controls the first two phases of the operating cycle (freezing and subcooling). It is located in the left side of the timer box 141 as shown in Figure 7.

The oscillating subassembly

As shown in Figure 3, motor 501 secured to bed plate 525 by screws 527, runs continuously, as described below under "Electrical control," imparting an oscillating rotation of constant frequency through an angle of 60° to timer box 141 through gears 503 and 507, keys 505 and 511, jack shaft 509, crank 513, link 515 and pin 519. Jack shaft 509 is supported by bearings 533 which are secured to bed plate 525 by screws 535 as shown in Figure 1. Said timer box 141, which is shown in Figures 7, 14, 15 and 16, turns freely about central shaft 133 on bushings 521 and 523. Bushings 521 are installed in sleeve 537 to which timer box 141 is secured by key 539. Bushing 523 is installed in the hub of timer box 141. Link 515 is rotatably mounted (see Figure 14) on pin 519 by means of bushing 529 and held clear of timer box 141 by washer 531. Pin 519 is secured to timer box 141 by means of threaded hole 520.

Dog 585 moves with timer box 141 by means of pin 583, bracket 581 and screws 587. Dog 585 is so shaped that it can turn on pin 583 in the direction of arrow 522 but stops against the wall of timer box 141 in the other direction. As timer box 141 nears the end of its motion in the direction of the arrow 524, dog 585 engages screw 577 giving arm ring 575 a short push in the direction of its motion. The oscillating subassembly, consisting of arm ring 575, secured to its hub 573 by screws 559 and stop screw 557 on bushing 571, is rotatably mounted on sleeve 555.

The shaft attached subassembly

The shaft attached subassembly consisting of sleeve 555, slotted ring 543 and arm ring 639 with screws 541 and 649, is secured to shaft 133 by key 691 and set screw 669. Spring 551 exerts tension between pin 549 on ring 543 and pin 553 on arm 575. Therefore, when timer box 141 starts back in the direction of arrows 526, spring 551 will pull the oscillating subassembly back in that direction by means of arm 575 until stop screw 557 engages end 546 of slot 544. In this way the oscillating subassembly is caused to oscillate about shaft 133 through only a very small angle but with the same periodicity as timer box 141. This small angle of oscillation can be adjusted by means of screw 577 and the adjustment set by lock-nut 579. Driving friction catches 589 and 589' are carried through this same small amplitude oscillation by pins 595 and 595' which are screwed to arm ring 575.

The cam subassembly

The cam subassembly consists of the driving friction wheel 597, spacer sleeve 605, bushing 603, harvesting control cam 607, spacer ring 615, switch cam ring 617, spacer ring 627, and holding friction wheel 629 fastened together by screws 599. This cam subassembly is rotatably mounted on sleeve 555 adjacent to the oscillating subassembly. The switch cam ring 617 carries the cam segments 619 and 621 which form a raised switch-operating section 622 which is adjustable in both arc length and rotational position by means of clamp bolt 623 through slots 624 and nut 625, which hold by friction in any one position the cam segments 619 and 621. The motion of the cam subassembly is controlled by the action of friction catches 589 and 589' on the edge of the friction wheel 597 and of friction catches 631 and 631' on the edge of the friction wheel 629. These two friction wheels have no teeth in them but their action, together with the friction catches, is similar to that of a pawl and ratchet. Friction catches 589 and 589' are so shaped that, as they turn with arm 575 in the direction of arrow 524, they engage the edge of friction wheel 597 tightly, turning said wheel 597 in the direction of arrow 524 along with arm 575. When spring 551 pulls arm 575 back in the direction of arrow 526, catches 589 and 589' are disengaged from wheel 597 thus allowing them to slide on wheel 597 without turning it. Pins 591 and 591' are so located on catches 589 and 589' that spring 593, stretched between them, exerts enough rotational force in the direction of arrow 634 on both catches to hold them continuously in contact with friction wheel 597. The action of catches 631 and 631', pins 635 and 635', spring 637 and pins 633 and 633' on friction wheel 629 is the same as the foregoing except that they operate in the reverse direction. Since arm ring 639 is keyed to central shaft 133, which is stationary at this time, the cam subassembly is driven in the direction of arrow 524 together with the oscillating subassembly but prevented from moving back in the direction of arrow 526 when the oscillating subassembly returns. The cam subassembly thus rotates in the direction of arrow 524 in small constant increments of constant frequency. It thus is similar in result to the action of a low speed timing cam and the speed of this timing cam is adjustable within operating requirements by screw 577 as described above.

Cam operated microswitch

Microswitch 647, with spacers 641 and 643, is secured to arm ring 639 in the shaft attached subassembly by screws 645. When the cam segments 619 and 621 engage the roller 671 of microswitch 647, the electrical contacts of the latter are opened deenergizing the power circuit to the pump 191, which stops. This starts the second (subcooling) phase of the operating cycle. As the cam subassembly continues its slow step-by-step motion, the raised portion of harvesting control cam 607 engages roller 609 starting the third (harvesting) phase of the operating cycle. (It will be noted that in Figure 15 to more clearly illustrate the construction, the cam segments 619 and 621 have been displaced approximately 90° from their true position on the switch cam ring 617 in the direction of arrow 524.)

To carry the electrical connections from microswitch 647, brush blocks 655 and 655', carrying brushes 667 and 667', springs 665 and 665', and connection screws 653 and 653', are secured to arm ring 639 by screws 651. Brushes 667 and 667' contact slip rings 657 and 657' which are carried on insulating ring 659. Ring 659 turns about shaft 133 with timer box 141 by means of a rigid connection to it through screws 663, arm 661, screws 673 and bracket 675. Insulated wires 677 and 677' connect the switch 647 to connecting screws 653 and 653'. Another pair of insulated wires 679 and 679' connect the slip rings 657 and 657' to a junction box 681 secured to the outside of timer box 141. Flexible leads 805 then carry the connections to the frame leg 147 and thence to pump motor 191' as shown in Figure 3.

Harvesting tripper

Shaft 561 is rotatably mounted in the timer box 141 by means of bearings 545 and 545' secured to timer box 141 by screws 547 and 547'. When the harvesting control cam 607 displaces roller 609 as described above, it turns shaft 561 in the direction of arrow 636 by means of pin 611 and arm 613. The roller 609 is held against cam 607 by the force of spring 567. Spring 567 is secured at one end to timer box 141 through pin 569, and at the other end to pin 565 on arm 563. The turning of shaft 561 in direction 636 starts the third (harvesting) phase of the operating cycle which is controlled by the harvesting mechanism.

Harvesting mechanism

The harvesting mechanism is essentially that portion of the timing and harvesting mechanism which is located to the right of slip rings 657 and 657' in Figure 7. The main shaft 133 is driven and indexed in its angular position by means of the ratchet subassembly which is secured to it by key 693 and which consists of ratchet wheels 683 and 687 and sleeve 685 held together by screws 689 and 691. During the freezing and subcooling phases of the operation the main shaft is stationary, being indexed with the keyways on top by pawls 701 and 701' in the corresponding notches of ratchet 687. These pawls turn freely on pins 703 and 703' which are secured to the rear legs of the chassis 147' by means of blocks 709 and 709', spacers 711 and 711' and nuts 777 and 777'. They are held against ratchet 687 by means of pins 705 and 705' and springs 707 and 707' which are hooked to rear legs 147'. Ratchet 687 is free to be moved only at the end of each stroke of timer box 141 when dog 699 pushes pawl 701 away from it or dog 699' pushes pawl 701' away. Dogs 699 and 699' are secured to timer box 141 in the positions shown. It will be seen then that at the start of the return stroke (of timer box 141) ratchet 687 may be moved, as described below, before dog 699 releases pawl 701 (or dog 699' releases pawl 701') but will be stopped when the released pawl 701 or 701' engages the next notch (in ratchet 687). These notches are equally spaced at 60° around the rim of ratchet 687. Thus the turning of the main shaft 133 is definitely indexed in 60° steps. A friction brake prevents the inertia from the weight of the evaporator on the main shaft from causing excessive impact when pawls 701 and 701' engage the notches in ratchet 687 at the end of its 60° motion. This brake consists of wheel 787, securing screws 789, lining 779, clamp strap 781, clamping screws 785, nuts 783, clamp arm 791, holding screws 793 and bracket 795 which is secured to the frame.

During the harvesting cycle the main shaft 133 and evaporator are turned by means of the action of the driving mechanism on ratchet 683. The construction of the driving mechanism is as follows: Stud 713 is secured to timer box 141 at 720. Reversing lever 757 and control plate 733 are rotatably mounted on stud 713 with bushings 773 and 747 respectively and spaced clear of timer box 141 by washer 763. They are connected by spring 739 on pins 737 and 741. Pawls 715 and 715' are rotatably mounted on pins 717 and 717' secured to control plate 733. These pawls are normally held in position with their back ends resting against a shoulder on stud 713 by means of springs 719 and 719' attached to pins 721 and 721' which are secured to the lower portion of control plate 733. Said control plate 733 is held in any one of three positions (forward, neutral or reverse) by the two notched positioning levers 735 and 735' which are rotatably mounted together with spacers 745 and 745' on pins 743 and 743' which are secured to timer box 141 at holes 744 and 744'. These notched levers 735 and 735' are held together by spring 731 on pins 729 and 729' so as to hold the corners of control plate 733 firmly in the notches of positioning levers 735 and 735'. Link 727, pin 725 and arm 723 are connected so as to cause pin 729' to be moved by the turning of shaft 561. Brackets 749 and 749' are secured to positioning levers 735 and 735' by screws 751 and 751' and support contact screws 753 and 753' with lock nuts 755 and 755'. Stops 759 and 759' together with latches 769 and 769' hold the reversing lever 757 in either of its two functioning positions. Stops 759 and 759' are secured to timer box 141 by screws 761 and 761'. Also secured by screws 761' is microswitch 775 in such position that it will be operated by pin 741 when reversing lever 757 is in position against stop 759'. Latches 769 and 769' are rotatably mounted on pin 765 together with spacer 771 and they are supported within the proper limits of their motion by pins 767 and 767' in slots 768 and 768'. Pins 765, 767 and 767' are all secured to timer box 141. The response of ratchet 683 to the action of the driving mechanism is registered back to said driving mechanism when roller 695, which is carried on the ratchet 683 by pin 697 contacts reversing lever 757 when said ratchet 683 has made a complete revolution.

The driving mechanism

The operation of the driving mechanism can best be followed by referring to Figures 17 through 24, inclusive. These are sectional views showing the co-relation of the pertinent parts in consecutive steps of the operation. Figure 17 shows the mechanism as it is during the freezing and subcooling phases at the limit of motion of timer box 141 in the direction of arrow 526. Henceforth, direction 524 is called "forward" and 526 is called "reverse" or "backward." Between the positions shown in Figures 17 and 18 the timer box 141 has moved forward, driving cam 607 far enough forward to end the subcooling phase of the operation, then backward causing cam 607, through roller arm 613, to turn shaft 561 in direction 636 which, in turn, causes arm 723 to pull positioning lever 735' away from control plate 733 by means of link 727 allowing spring 739 to turn control plate 733 into the forward position (upper notch on positioning lever 735'). This tilting of control plate 733 causes pawl 715' to engage ratchet 683 to turn it 60° in the forward direction. When timer box 141 moves back again pawl 715' engages ratchet 683 at the next notch and moves it another 60°. It will be remembered that ratchet 683 is stopped at 60° by the action of pawl 701' on ratchet 687 on the outside of the box. Ratchet 683 continues to turn forward in 60° steps in this manner (2 strokes of timer box 141, one forward and one back, for each 60° turn of ratchet 683), until 9½ strokes (of timer box 141) later (Figure 19) it is in the position to lift latch 769 releasing reversing lever 757 as timer box 141 moves backward on its tenth stroke after engagement of pawl 715' in the first notch of ratchet 683. Figure 20 shows the relative positions on completion of the 10th stroke after lever 757 has engaged roller 695 and been turned far enough about stud 713 to engage latch 769' in the reverse position, reversing the direction of pull of spring 739 on pin 737 from that indicated in Figure 18. Figure 21 shows the positions one stroke later (total of 11 strokes after engagement), when it will be noted that roller 695 (and, therefore, the evaporator) has made a complete turn of 360°. As timer box 141 starts back on its 12th stroke, roller 695, being stationary, starts to turn reversing lever 757 a little farther causing it to tilt notched lever 735, through contact with screw 753, enough to release the corner of control plate 733 so that spring 739 pulls it into the reverse position. Consequently, pawl 715 which is made just a little shorter than pawl 715' immediately engages the adjacent slot in ratchet 683 as shown in Figure 22. Thus, 12 strokes after the original engagement of pawl 715' with ratchet 683, said ratchet 683 has turned one complete revolution and 60° backward toward its original position. Figure 23 shows the relative positions 9½ strokes later; i. e., 21½ strokes after the start of harvesting, with the timer box 141 moving forward at the middle of the 22nd stroke. As this stroke continues, reversing lever 757 engages roller 695, which is now back in its original position, and is turned by it to the position shown in Figure 24 at the completion of the 22nd stroke. Figure 24 also shows that reversing lever 757 has thus again reversed the direction of pull of spring 739 and, by contact with screw 753', has tilted positioning lever 735' just enough to allow control plate 733 to turn into engagement with the neutral (middle) notch of positioning lever 735' due to the pull of spring 739. Thus pawls 715 and 715' are both held clear of ratchet 683 and the evaporator on the main shaft is held stationary until the completion of the freezing and subcooling portions of the next cycle when shaft 561 is turned to trip the harvesting drive again.

It should be noted at this point that during the harvesting operation described above the timing mechanism is carried around with the main shaft (refer to Figures 14 and 15), first in forward direction (arrow 524), then back in the reverse direction (arrow 526) for a full 360° rotation. As it completes the reverse rotation, timing cam 607 is definitely indexed for the start of the timing cycle when it hooks against roller 609.

Changes in timing

The timing of the total cycle of operation and the relative portions of that time allotted to freezing and subcooling can be adjusted to suit any particular set of operating conditions. The time required for the harvesting will remain a constant with respect to the total time of the operating cycle, requiring 22 strokes of the timing box 141. The total operating cycle time may be increased by turning screw 577 (Figure 14) in to produce less motion of arm ring 575 per stroke and, therefore, making a greater number of strokes necessary to bring the rise of cam 607 (Figure 15) into contact with roller 609. This time may be decreased also by turning screw 577 farther out. By varying the location of cam segments 619 and 621, the time at which pump 191 is shut off may be made sooner or later in the period between the end of harvesting and the beginning of harvesting in the following cycle. Cam segments 619 are spread to cover a longer arc on cam ring 617 when the pump is cut off sooner so that it will remain off until harvesting takes place.

Timing box electrical connections

Switch 775 is provided to prevent the starting of liquor feed pump 191 until the instant reversing lever 757 latches with control plate 733 in the neutral position at the completion of the harvesting cycle.

Referring again to Figures 3 and 7, removable access covers 797, 799 and 801 are provided. These covers are screwed to timer box 141 with gasket material to seal them tight to retain lubricant within the box for splash lubrication of the parts. Plug 803 is provided to drain the lubricant before removal of the covers for access to the parts inside the timer box 141.

Electrical leads 261 from the evaporator heaters 255 (see Figures 6 and 7) are carried out through shaft 133 to connection box 807 and thence through flexible lead 809 (Figure 3), wound on reel 263 to connection box 811 for tie-in to the rest of the circuit. The flexible leads thus allow the forward and reverse turning of the main shaft 133 during harvesting without interference with the heater circuit. Reel 263 is made up of two plates 813, eight spacers 815, screws 817 and nuts 819. It is secured to brake wheel 787 by means of screws 821 and spacers 823. Box 807 is secured to brake wheel 787 by means of pipe nipple 825.

Purge line

A refrigerant purge line 259 (Figures 5, 6 and 7), is provided to permit blowing off accumulated oil occasionally. Nipple 827 is located to reach the lowest point of the evaporator chamber. Nipple 827 is connected by tubing 259 through hollow main shaft 133, nipple 825 and box 807 to purge valve 827.

Electrical control

Figure 28 is a diagram of the electrical circuit controlling the operation of the machine. The supply power is from two sources: one is 220 volt, 60 cycle, 3 phase; the other is 110 volt, 60 cycle, single phase. Switch 901 is the cut-out switch for the 220 volt supply. Starters 903 and 905 are conventional magnetic starters with overload protection controlling drive motor 501 and ammonia pump motor 47 respectively. Switches 907 and 909 are conventional push-button stations controlling starters 903 and 905 respectively. Relay 911 is an interlocking relay controlled by the operation of starter 903. Normally open contact 912 of relay 911 is so connected that it stops the refrigerant recirculation pump motor 47 whenever the drive motor 501 stops. Solenoid valve 913, also controlled by the operation of starter 903, automatically cuts off the supply of liquid refrigerant when the machine stops. Switches 915 and 917 are cut-off switches on the 110 volt circuit. Switch 915 controls the supply of power to liquor supply pump motor 191. This motor is controlled by the circuit through switches 647 and 775 and slip rings 657 and 657' as previously described. Also included in this circuit is the normally open contact 914 of relay 911 so that the pump motor 191 cannot run unless the drive motor 501 is also running. Switch 917 controls the supply of power to the several resistance heater units: the bearing heaters 267, 267' and 267"; the liquor feed heaters 271, 271', 271" and 271''' and the evaporator heater 255. The power to all these heater units passes through the normally open contact 916 of relay 911 so that they are all automatically turned off when the drive motor 501 stops. Cut-out switch 919 and variac 925 control the heat at the bearing heaters 267, 267' and 267". Cut-out switch 921 and variac 927 control the heat at evaporator heater 255. Cut-out switch 923 and variac 929 control the heat at liquor feed heaters 271, 271', 271" and 271'''.

*Setting the deflection*

The nature of the material being frozen and the thickness of the frozen ribbon desired determine the amount of deflection; that is, the difference of the radius of curvature required to obtain peeling. This deflection is obtained by pouring into the cylinder just enough propylene glycol or similar heat transfer lubricant to cause the cylinder at the bottom to change its radius of curvature the required amount.

The characteristics of the propylene glycol or the antifreeze solution should be predetermined so as to give a viscosity suitable to the temperatures at which the operation is to take place.

*Normal operation*

The timing and harvesting mechanism is then set to give the required freezing, subcooling and harvesting portions of the cycle by setting screw 577 and cam segments 619 and 621, the operation of which has already been described hereinabove. The insulated box enclosing the machine is then closed and the interior cooled to a suitable temperature by permitting refrigerant to flow from liquid supply main 25 (Figure 2) through valve 321, main 323, cooling coils 309, suction main 327, valve 329 into the main suction of the compressor 77. The drive motor 501 is then started by means of started 903 and push button 907 in the method described hereinabove. The energization of the starter 903 also energizes solenoid valve 913 permitting liquid refrigerant to fill the surge drum 35 through valve 27 to the proper level as determined by float valve 31. As soon as the proper level of refrigerant has been reached ammonia pump motor 47 may be started by means of starter 905 and push button 909. Liquor supply pump motor 191' can then be started by closing switch 915 which pumps the liquor to be frozen onto the surface of the freezing panels 145 of flexible cylinder 144 as has also been described hereinabove.

The timing and harvesting mechanism 141 as described hereinabove then automatically stops and restarts the liquor pump 191 so as to freeze a ribbon of the required thickness and subcool it to the required temperature, and then the timing box starts the harvesting portion of the cycle as has been described hereinabove. Due to the change in configuration of the flexible cylinder freezing panels 145 the frozen ribbon peels from them as the cylinder rotates in the direction of the arrow 524 (Figure 8). As the ribbon peels it is guided by the under-surface of the shield 331 into chute 302 leading to the storage bin. The cylinder is then oscillated back into the original position as described above.

When needed the heaters 267, 267' and 267" for the bearings, the heaters 255 for the evaporator and the heaters for the feed liquor 271, 271', 271" and 271''' may be energized by manually operating switch 917 and switches 919, 921 and 923, and adjustment of variacs or auto transformers 925, 927 and 929.

*Alternate method of operation*

The machine can be operated continuously rotating in one direction by the following: first, secure arm ring 639 (Figure 15) to friction wheel 629 with screws or other means. Second, disconnect link 727 from pin 725 (Figure 16). Third, remove roller 695 and stud 697. Fourth, remove pawl 701. Fifth, substitute slip rings and brushes for the reel 263 and flexible lead 809 to connect the electrical leads 261 to the fixed source of supply. In this way the step-by-step forward rotation of the cam subassembly described above will be transmitted to the main shaft 133 and thus to the evaporator. The harvesting mechanism will then remain inoperative in the neutral position. In this manner the timing mechanism becomes in effect a variable ratio speed reducer with a relatively high speed ratio.

I claim:

1. In the art of congealing a liquor, that improvement which includes the steps of applying a coating of liquor to a freezing surface, congealing the coating, stopping the application of liquor, wiping the exposed surface of the congealed coating compound, subcooling the congealed coating a predetermined amount, repeating the above steps, and removing the congealed subcooled coating.

2. In the art of congealing a product on an endless heat transfer belt and then flexing the belt to a shorter radius of curvature to remove the congealed product therefrom, that improvement which includes the steps of hanging the belt over a heat transfer drum, tensioning the belt against the drum by weighting the lower depending loop of the belt with a quantity of heat transfer liquid confined within the belt, and rotating the drum to move the belt about the drum and thus carry heat transfer liquid into the region where the belt is held against the drum so as to increase heat transfer between belt and drum.

3. A heat transfer apparatus including an arcuate heat transfer surface, a liquor supply disposed adjacent said surface, a liquor wiper assembly disposed adjacent said surface, a radius arm structure by which said assembly is supported, said structure including an axis of rotation coinciding with the axis about which said surface is arcuate, said wiper assembly including a wiper member movable by said structure through an arcuate path adjacent to said arcuate surface, a source of power, and a drive mechanism forming a part of the apparatus and associated with said assembly to effect relative movement thereof with respect to said surface.

4. A heat transfer apparatus including an arcuate heat transfer surface, a liquor supply assembly disposed adjacent said surface, a liquor wiper assembly disposed adjacent said surface, a radius arm structure by which said assemblies are supported, said structure including an axis of rotation coinciding with the axis about which said surface is arcuate, said wiper assembly including a wiper member movable by said structure through an arcuate path adjacent to said arcuate surface, a source of power, and a drive mechanism including an oscillating unit forming a part of the apparatus and associated with said assemblies to effect oscillating movements thereof with respect to said surface.

5. A heat transfer apparatus including a cylindrical heat transfer drum disposed for axial rotation about a horizontal axis, an endless heat transfer belt enveloping said drum, the distance around the interior of said belt being materially greater than the distance around the exterior of said drum, the lower portions of said belt hanging in a catenary curve below the lower portions of said drum to define a space therebetween the size of which is dependent at least in part upon the amount by which said distance around said belt is greater than said distance around said drum, and a quantity of heat transfer medium contained within said space and supported primarily by the hanging catenary portions of said belt.

6. A heat transfer apparatus including a heat transfer drum disposed for axial rotation about a horizontal axis, an endless heat transfer belt enveloping said drum, the distance around the interior of said belt being materially greater than the distance around the exterior of said drum, an inturned flexible flange member sealed to and extending along each edge of said belt, the lower portions of said belt hanging below the lower portions of said drum to define together with said flange members a space the size of which is dependent at least in part upon the amount by which said distance around said belt is greater than said distance around said drum, and a quantity of heat transfer medium contained within said space and supported primarily by the hanging portion of said belt.

7. A heat transfer apparatus including a heat transfer drum disposed for axial rotation about a horizontal axis, a hub construction at each end of said drum coaxially arranged with respect to said horizontal axis, an endless heat transfer belt enveloping said drum, the distance around the interior of said belt being materially greater than the distance around the exterior of said drum, an apron-like member at each side of said belt defining an imperforate barrier between the belt edge and the adjacent hub construction, the lower portions of said belt hanging below the lower portions of said drum to define with said apron-like members a space the size of which is dependent at least in part upon the amount by which said distance around said belt is greater than said distance around said drum, and a quantity of heat transfer medium contained within said space and supported primarily by the hanging portion of said belt.

8. A heat transfer apparatus including a heat transfer drum disposed for axial rotation about a horizontal axis, an endless heat transfer belt enveloping said drum, the distance around the interior of said belt being materially greater than the distance around the exterior of said drum, an inturned flexible flange member sealed to and extending along each edge of said belt, an open ring member at each end of said drum, the inturned edge of each flange member being secured to and supported by a ring member, the lower portions of said belt hanging below the lower portions of said drum to define together with said flange members a space therebetween the size of which is dependent at least in part upon the amount by which said distance around said belt is greater than said distance around said drum, and a quantity of heat transfer medium contained within said space and supported primarily by the hanging portion of said belt.

9. A heat transfer apparatus including a cylindrical heat transfer drum mounted for rotation about its axis, a heat transfer belt of length greater than the distance around said drum passing around and held in contact with a portion of said drum, an annular groove means running around said drum a predetermined distance inwardly from one end of the drum, a tracking rib means running along the inner surface of said belt parallel to an edge thereof and spaced inwardly a predetermined amount from such edge thereof, said tracking rib means engaging in said groove means to prevent said belt from creeping toward either end of said drum when said drum is rotated, and a heating element disposed in said groove means in warming relationship with respect to said rib means.

10. A heat transfer apparatus including a cylindrical heat transfer drum mounted for rotation about its axis, a heat transfer belt of length greater than the distance around said drum passing around and held in contact with a portion of said drum, a strip of rubber-like material running along and forming a part of said belt parallel to an edge thereof, and a heat transfer subsystem forming a part of the apparatus and arranged in heat transfer relationship with respect to said strip to maintain a predetermined temperature relationship between said strip and adjacent portions of said belt.

11. A heat transfer apparatus including a cylindrical heat transfer drum mounted for rotation about its axis, a heat transfer belt of length greater than the distance around said drum passing around and held in contact with a portion of said drum, said belt comprising a pair of parallel strips of heat transfer material secured together by an intermediate joining strip, an annular groove means running around said drum inwardly from one end of the drum, said joining strip overlying said groove means, and a heating element in said groove means arranged to maintain a predetermined heat differential between said joining strip and adjacent portions of said heat transfer strips.

12. A heat transfer apparatus including a cylindrical heat transfer drum mounted for rotation about its axis, a heat transfer belt of length greater than the distance around said drum passing around and held in contact with a portion of said drum, said belt comprising a pair of parallel strips of heat transfer material secured together by an intermediate joining strip, an annular groove means running around said drum inwardly from one end of the drum, a tracking rib running along the inner surface of said joining strip, said tracking rib engaging in said groove means to prevent said belt from creeping toward either end of said drum when said drum is rotated, and a heating element in said groove means in heating relationship with said joining strip.

13. A heat transfer apparatus including a cylindrical heat transfer drum mounted for rotation about its axis, a heat transfer belt of length greater than the distance around said drum passing around and held in contact with a portion of said drum, said belt comprising a heat transfer strip and a joining strip contiguous therewith and secured thereto, an annular recess construction running around said drum, and heating mechanism housed within said recess construction and in heat transfer relationship with said joining strip.

14. A heat transfer apparatus including a cylindrical heat transfer drum mounted for rotation about its axis, a heat transfer belt passing around and held in contact with at least a portion of said drum, a tracking means running along said belt and forming a part of said belt parallel to an edge thereof, said tracking means engaging with complemental means located with respect to said drum to prevent said belt from creeping toward either end of said drum when said drum is rotated, and a heating system forming a part of the apparatus and arranged to maintain said tracking means above a predetermined temperature.

15. A heat transfer apparatus including a drum means, a heat transfer cylinder enveloping said drum means to form with said drum means a heat transfer medium passageway through which heat transfer medium may pass in good heat transfer relationship with the inner surface of said cylinder, hub means associated with said drum means at each end thereof, bearing means rotatably carrying said drum means through said hub means, a conduit entering said drum means through the hub means at one end of said drum means and communicating with one end of said passageway, a conduit communicating with the other end of said passageway and leading from said drum means through the hub means at said one end of said drum means, drum control means forming a part of said apparatus and operative through the hub means at the other end of said drum means to apply turning forces to said hub means, and said control means including a driven member, a drum-driving member, and an adjustable assembly intermediate said members whereby the forces applied to said drum means may be predetermined.

16. A heat transfer apparatus including a drum means, a heat transfer cylinder enveloping said drum means to form at least part of a heat transfer medium passageway through which heat transfer medium may pass in good heat transfer relationship with an inner surface of said cylinder, a conduit leading to said drum means and communicating with one end of said passageway, a conduit communicating with the other end of said passageway and leading from said drum means, hub means associated with one end of said drum means, bearing means rotatably supporting said drum means through said hub means, drum control means operative through said hub means to apply turning forces to said drum means, said control means including a driven member and a drum driving member and power coupling means between said members, and an adjustable counting subassembly dominating said coupling means whereby the turning forces applied to said drum means may be predetermined.

17. A heat transfer apparatus including a drum means, a heat transfer cylinder enveloping said drum means to form at least part of a heat transfer medium passageway through which heat transfer medium may pass in good heat transfer relationship with an inner surface of said cylinder, a conduit leading to said drum means and communicating with one end of said helical passageway, a conduit communicating with the other end of said passageway and leading from said drum means, grooves on exterior portions of said cylinder adapted to contain a heat exchange medium, and a heat transfer belt encompassing at least part of said cylinder and overlying at least some of said grooves.

18. A heat transfer apparatus including a horizontally disposed cylindrical heat transfer drum means, mounting structure in which said drum means are mounted, power unit means associated with said mounting structure by which said drum means may be turned, heat transfer medium supply and exhaust means communicating with the interior of said drum means, a heat transfer belt passing over said drum means, a liquor supply means associated with exterior portions of said belt in the region where said belt passes over said drum means, and a cycling system operatively associated with said means and including system portions controlling each of said means, and said system portions being responsive to a cycling subassembly having a liquor supply phase, a heat transfer phase, and a belt flexing phase.

19. A heat transfer apparatus including a horizontally disposed cylindrical heat transfer drum, mounting structure in which said drum is mounted, a power unit assciated with said mounting structure by which said drum may be turned, heat transfer medium supply and exhaust conduits communicating with the interior of said drum, a heat transfer belt passing over said drum, a liquor supply assembly associated with exterior portions of said belt in the region where said belt passes over said drum, a cycling system operatively associated with said power unit, supply conduits, and liquor assembly, said cycling system including system portions controlling said power unit, supply conduits, and liquor assembly, and said system portions being responsive to a cycling subassembly having a liquor supply phase, a heat transfer phase, and a belt flexing phase.

20. A heat transfer apparatus including a horizontally disposed cylindrical heat transfer drum, mounting structure in which said drum is mounted, a power unit associated with said mounting structure by which said drum may be turned, heat transfer medium supply and exhaust conduits communicating with the interior of said drum, a heat transfer belt passing over said drum, a liquor supply assembly associated with exterior portions of said belt in the region where said belt passes over said drum, a cycling system operatively associated with said power unit, supply conduits, and liquor assembly, said cycling system including system portions controlling said power unit, supply conduits, and liquor assembly, said system portions being responsive to a cycling subassembly having a liquor supply timer, a heat transfer timer, and a belt flexing timer, and said timers being adjustable with respect to each other and together determining a cycle of the apparatus.

21. A heat transfer apparatus including heat transfer drum means, mounting structure in which said drum means is mounted, a power unit associated with said mounting structure by which said drum means may be turned, heat transfer medium supply and exhaust conduits communicating with said drum means, a liquor supply assembly associated with exterior portions of said drum means, a cycling system operatively associated with said power unit, supply conduits, and liquor assembly, said cycling system including system portions controlling said power unit, supply conduits, and liquor assembly, and said system portions being responsive to a cycling subassembly having a liquor supply phase, a heat transfer phase, and a drum means turning phase.

22. A heat transfer apparatus including a horizontally disposed cylindrical heat transfer drum, mounting structure in which said drum is mounted for rotation about its axis, a power unit associated with said mounting structure by which said drum may be rotated, heat transfer medium supply and exhaust conduits communicating with the interior of said drum, a liquor supply assembly associated with exterior portions of said drum, a cycling system operatively associated with said power unit, supply conduits, and liquor assembly, said cycling system including system portions controlling said power unit, supply conduits, and liquor assembly, said system portions being responsive to a cycling subassembly having a liquor supply phase, a heat transfer phase, and a belt flexing phase, said subassembly comprising a series of coaxially arranged timing elements, said timing elements being rotated in response to power from said power unit, and said drum being rotated in response to rotary movements of said timing elements.

References Cited in the file of this patent

UNITED STATES PATENTS

| Number | Name | Date |
|---|---|---|
| 2,005,735 | Field | June 25, 1935 |
| 2,078,938 | Field | May 4, 1937 |
| 2,119,182 | Schuftan | May 31, 1938 |
| 2,152,467 | Crosby | Mar. 28, 1939 |
| 2,245,103 | Field | June 10, 1941 |
| 2,280,320 | Taylor | Apr. 21, 1942 |
| 2,334,941 | Linden | Nov. 23, 1943 |
| 2,344,922 | Raver | Mar. 21, 1944 |
| 2,405,272 | Smith | Aug. 6, 1946 |
| 2,405,273 | Smith | Aug. 6, 1946 |
| 2,412,621 | Knowles | Dec. 17, 1946 |
| 2,431,278 | Raver | Nov. 18, 1947 |
| 2,526,262 | Munshower | Oct. 17, 1950 |
| 2,542,891 | Bayston | Feb. 20, 1951 |
| 2,546,092 | Field | Mar. 20, 1951 |
| 2,571,506 | Watt | Oct. 16, 1951 |
| 2,585,021 | Lessard | Feb. 12, 1952 |
| 2,598,429 | Pownall | May 27, 1952 |
| 2,598,430 | Pownall | May 27, 1952 |
| 2,610,474 | Field | Sept. 16, 1952 |
| 2,613,511 | Walsh | Oct. 14, 1952 |
| 2,616,271 | Knowles | Nov. 4, 1952 |

FOREIGN PATENTS

| Number | Country | Date |
|---|---|---|
| 660,494 | Germany | May 27, 1938 |